(12) United States Patent
Chikusa et al.

(10) Patent No.: US 8,478,729 B2
(45) Date of Patent: Jul. 2, 2013

(54) SYSTEM AND METHOD FOR CONTROLLING THE STORAGE OF REDUNDANT ELECTRONIC FILES TO INCREASE STORAGE RELIABILITY AND SPACE EFFICIENCY

(75) Inventors: Takashi Chikusa, Odawara (JP); Issei Hidaka, Yokohama (JP); Hironori Nakama, Odawara (JP); Masashi Yukawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 467 days.

(21) Appl. No.: 12/423,483

(22) Filed: Apr. 14, 2009

(65) Prior Publication Data
US 2009/0204652 A1 Aug. 13, 2009

Related U.S. Application Data

(63) Continuation of application No. 11/198,181, filed on Aug. 8, 2005, now abandoned.

(30) Foreign Application Priority Data

Jun. 3, 2005 (JP) ................................ 2005-163801

(51) Int. Cl.
*G06F 17/30* (2006.01)
(52) U.S. Cl.
USPC ........................................................ 707/692
(58) Field of Classification Search .................. 707/641, 707/699, 692, 661, 664, 101, 999.101
See application file for complete search history.

(56) References Cited

U.S. PATENT DOCUMENTS

| | | | |
|---|---|---|---|
| 4,987,533 A | 1/1991 | Clark et al. | |
| 5,778,395 A | 7/1998 | Whiting et al. | |
| 5,870,109 A * | 2/1999 | McCormack et al. | 345/565 |
| 6,088,704 A * | 7/2000 | Aiba | 1/1 |
| 6,141,728 A * | 10/2000 | Simionescu et al. | 711/113 |
| 6,185,360 B1 * | 2/2001 | Inoue et al. | 386/46 |
| 6,327,671 B1 | 12/2001 | Menon | |
| 6,651,137 B2 | 11/2003 | Baek et al. | |
| 6,687,805 B1 * | 2/2004 | Cochran | 711/209 |
| 6,785,786 B1 | 8/2004 | Gold et al. | |
| 6,889,297 B2 * | 5/2005 | Krapp et al. | 711/159 |
| 7,092,977 B2 | 8/2006 | Leung et al. | |
| 7,117,323 B1 * | 10/2006 | Delaney | 711/162 |
| 7,185,031 B2 | 2/2007 | Rand | |
| 2005/0010620 A1 * | 1/2005 | Silvers et al. | 707/205 |
| 2006/0047999 A1 * | 3/2006 | Passerini et al. | 714/6 |
| 2006/0236048 A1 * | 10/2006 | Deguchi et al. | 711/162 |

FOREIGN PATENT DOCUMENTS

JP 7-319897 12/1995

* cited by examiner

*Primary Examiner* — Mohammed R Uddin
(74) *Attorney, Agent, or Firm* — Antonelli, Terry, Stout & Kraus, LLP.

(57) ABSTRACT

A storage control system including an overlap retrieval arrangement for retrieving overlap files, which are stored in at least one storage area of a plurality of storage areas, and which overlap one another, and a storage controlling arrangement for storing data of at least one overlapped part of the retrieved overlap files in a storage area having reliability that is greater than that of the storage area in which the data of this overlapped part is stored. A large number of files are stored in a plurality of storage areas, and the overlap retrieval arrangement retrieves overlap files from among a number of files, which is smaller than the number of stored files.

12 Claims, 24 Drawing Sheets

FIG. 3A (1) STORAGE MANAGEMENT TABLE  51

| VOLUME ID | PATH NAME | FILENAME | DATA LENGTH | ATTRIBUTE INFORMATION |
|---|---|---|---|---|
| Nas_01 | ¥aaa | File_1 | 5120 | UPDATE DATE, ETC. |
| Nas_02 | ¥bbb | File_2 | 32100 | UPDATE DATE, ETC. |
| Nas_xx | ¥yyy | File_zz | 32100 | UPDATE DATE, ETC. |
| .. | .. | .. | .. | .. |

REFERENCE LOCATION INFORMATION

| PHYSICAL DEVICE ID | LUN | TOP LBA | USED DATA LENGTH | LINK TABLE |
|---|---|---|---|---|
| 20 | 0 | 00001000h | 5120 | --- |
| 20 | 1 | 00002000h | 20480 | --- |
| 20 | 1 | 00002000h | 20480 | --- |
| .. | .. | .. | .. | .. |

FIG. 3B (2) RELIABILITY COMPARISON TABLE  55

| PHYSICAL DEVICE ID | LUN | RAID LEVEL | NUMBER OF HDD UNITS | HDD TYPE |
|---|---|---|---|---|
| 20 | 0 | 5+1 | 5×2 | FC |
| 20 | 1 | 5 | 8 | FC |
| 20 | 2 | 5 | 8 | SAS |
| 20 | 3 | 5 | 8 | SAS |
| .. | .. | .. | .. | .. |

| FREE CAPACITY | DEVICE MOUNT DATE/TIME | RELIABILITY RANKING |
|---|---|---|
| 1000GB | 2002.1.1  0:00:00 | 1 |
| 1600GB | 2002.1.1  0:00:00 | 2 |
| 1600GB | 2002.1.1  0:00:00 | 4 |
| 1600GB | 2004.9.20 16:00:00 | 3 |
| .. | .. | .. |

RELIABILITY RANKING: LU0(RAID5+1)>LU1(RAID5)

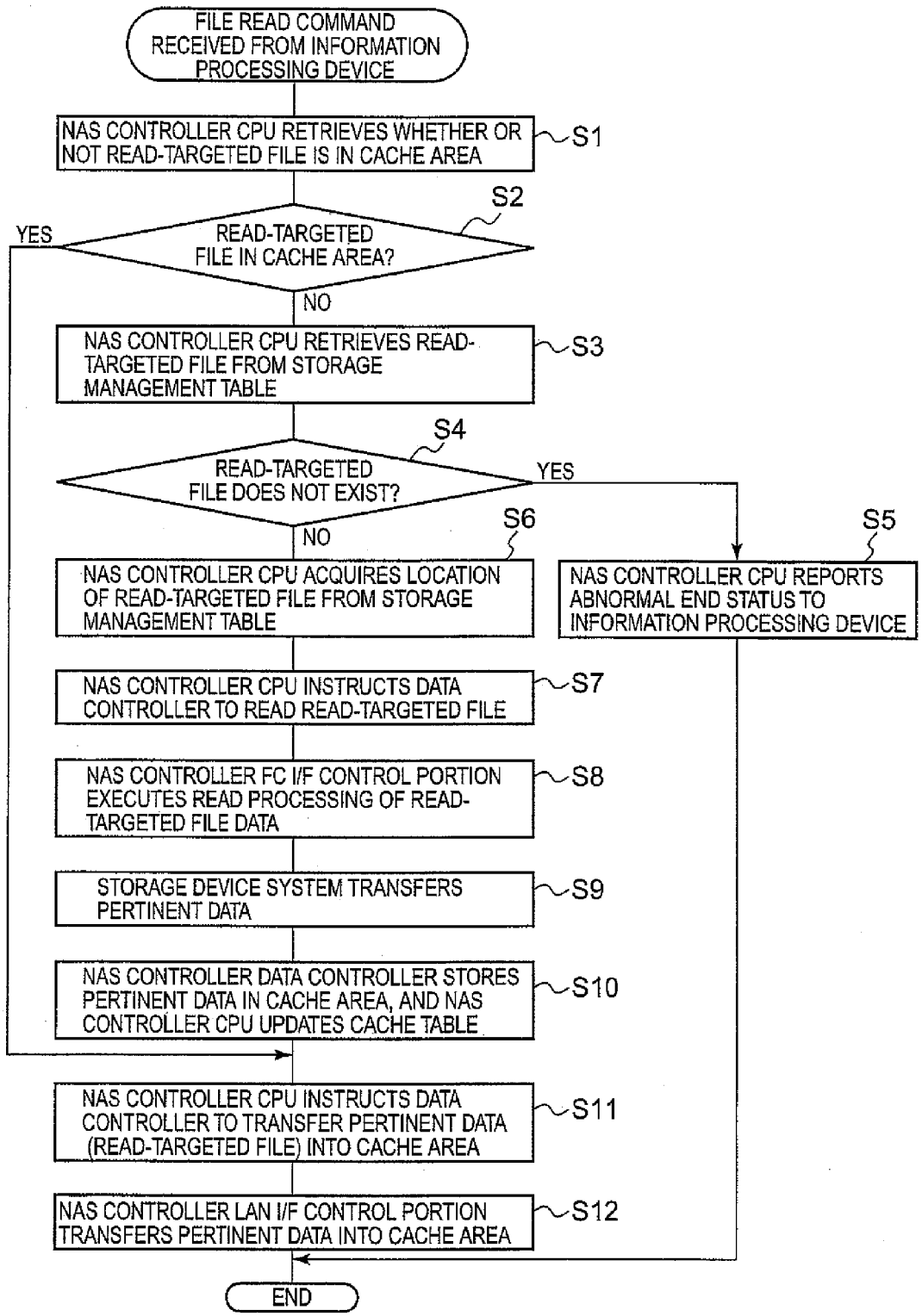

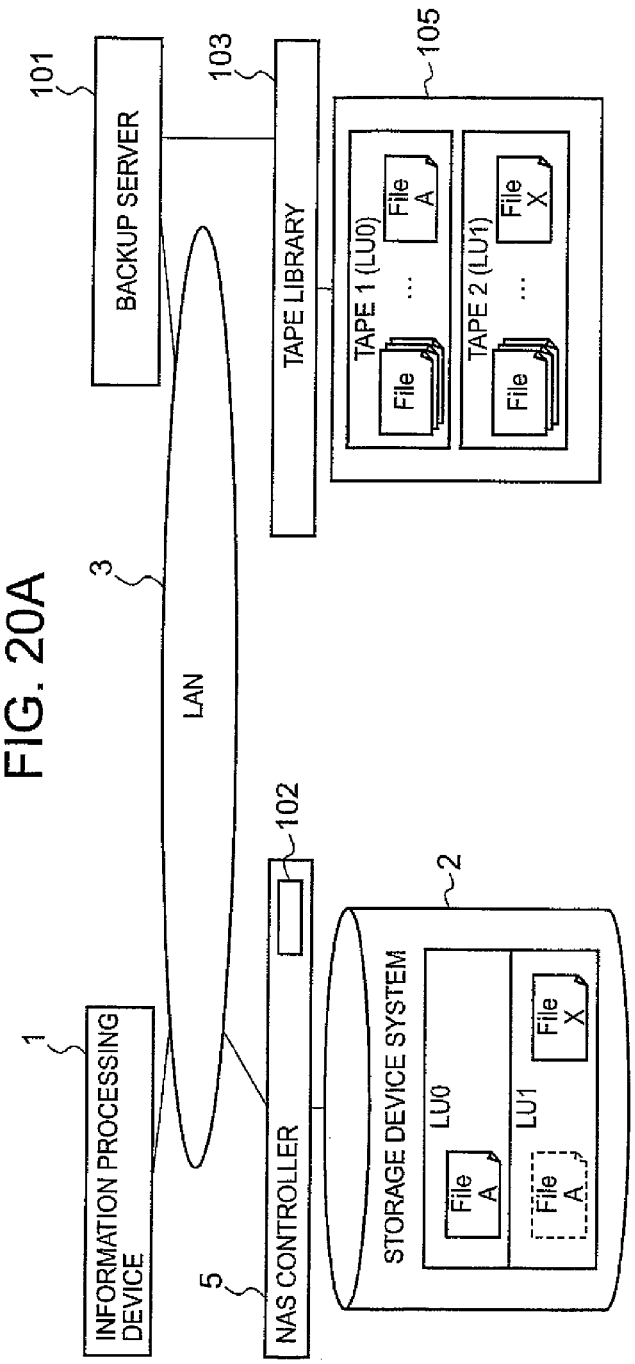
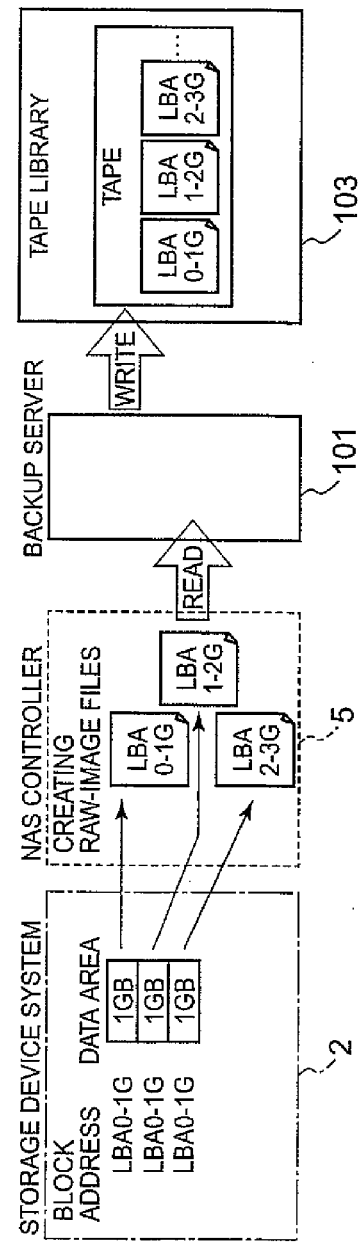
FIG. 20A
FIG. 20B

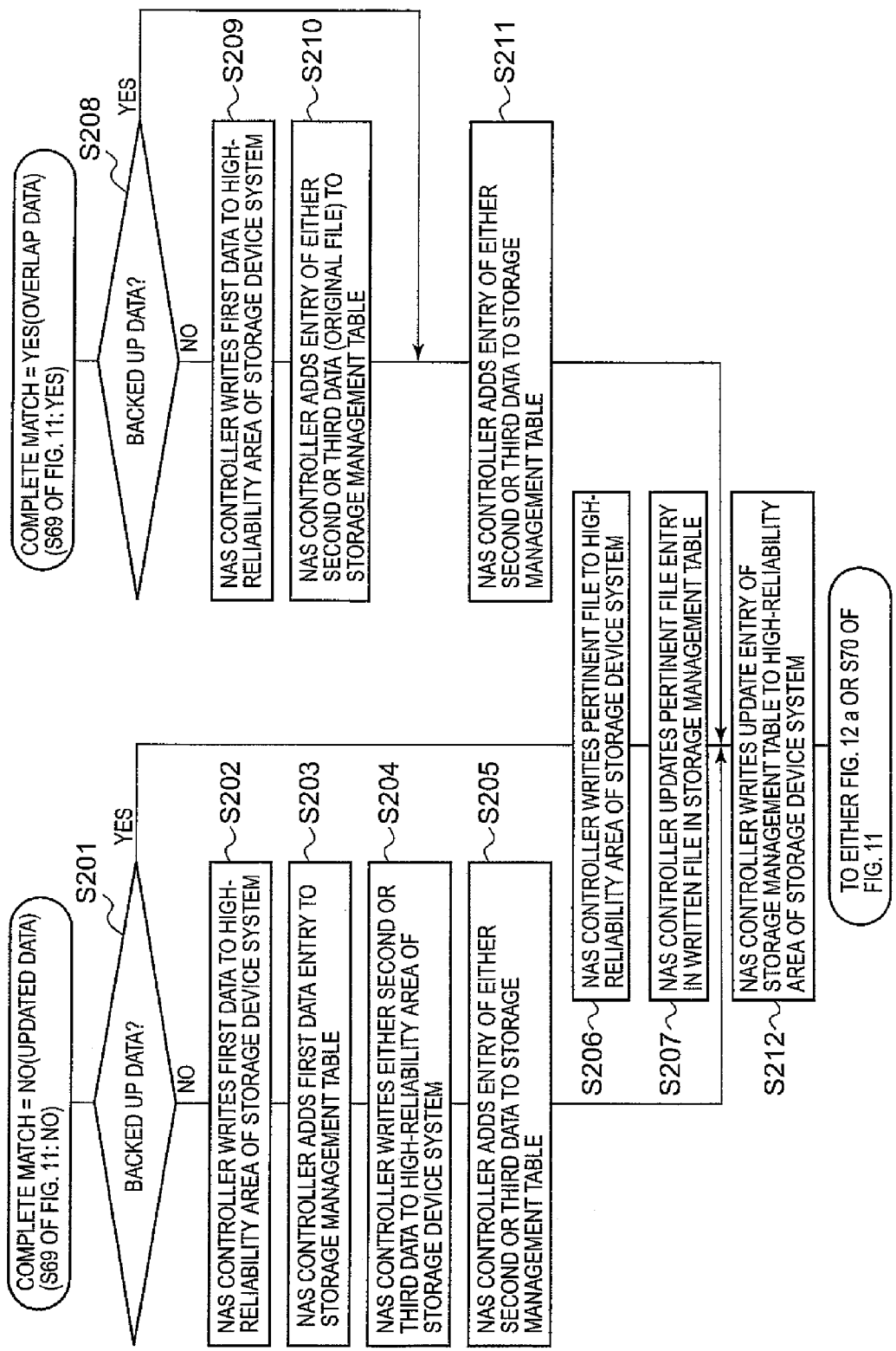

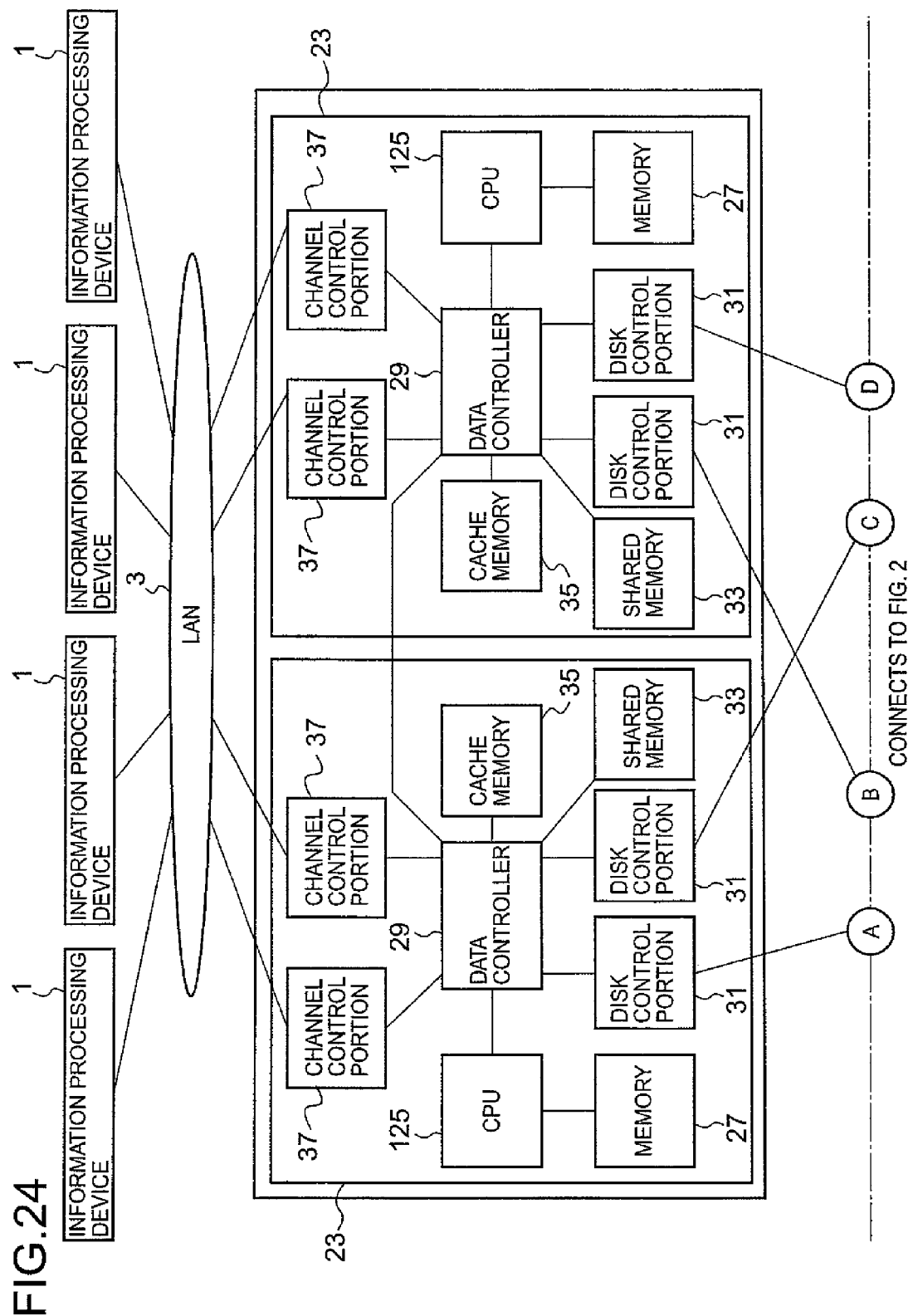

SYSTEM AND METHOD FOR CONTROLLING THE STORAGE OF REDUNDANT ELECTRONIC FILES TO INCREASE STORAGE RELIABILITY AND SPACE EFFICIENCY

CROSS REFERENCE TO RELATED APPLICATION

This is a continuation of U.S. application Ser. No. 11/198,181, filed Aug. 8, 2005 now abandoned. This application relates to and claims priority from Japanese Patent Application No. 2005-163801, filed on Jun. 3, 2005. The entirety of the contents and subject matter of all of the above is incorporated herein by reference.

BACKGROUND OF THE INVENTION

1. Field of the Invention

The present invention relates to technology for controlling the storage of electronic files.

2. Description of the Related Art

For example, in today's information society, the number of files in storage is increasing on a daily basis, and this is a source of concern for people who utilize storage (for example, information processing system users and storage administrators). Among these files, there are numerous files that are not really necessary (for example, backups of old files, or files that have been copied and left as-is without much thought being given to them). Since deleting these unnecessary files increases free storage capacity, the technology disclosed in Japanese Patent Laid-open Publication No. 7-319897, for example, is known as technology for controlling the storage of electronic files. In this technology, for example, the degree of conformance of a first and a second file stored on a storage medium is acquired, and from this acquired degree of conformance a determination is made as to whether or not the first file and the second file are similar, and when, as a result, they are determined to be similar, one of them, either the first file or the second file, is deleted from the above-mentioned storage medium.

In the above-mentioned Japanese Patent Laid-open Publication No. 7-319897, when a first and a second file are determined to be similar, one of them, either the first file or the second file, is deleted. This saves storage capacity that would have been consumed. However, in Japanese Patent Laid-open Publication No. 7-319897, there is no particular criterion for determining which of the files, the first file or the second file, is saved. For this reason, there is no way of lowering the risk of the saved file being lost.

Further, in the above-mentioned Japanese Patent Laid-open Publication No. 7-319897, a determination of similarity is carried out by comparing all files using the brute force method. However, for example, when a large number of files are stored, since the scope of the search constitutes all of these numerous files, finding files that are similar to one another takes a long time.

SUMMARY OF THE INVENTION

Therefore, an object of the present invention is to lower the risk of a file being lost.

A further object of the present invention is to make it possible to shorten the time it takes to detect files, which are either completely or partially overlapped, to at least less than the time required for detection using the brute force method.

Other objects of the present invention will become clear from the following explanation.

A storage control system according to a first aspect of the present invention comprises overlap retrieval means for retrieving overlap files, which are stored in at least one storage area of a plurality of storage areas, and which overlap one another; and storage controlling means for storing data of at least one overlapped part of the above-mentioned retrieved overlap files in a storage area having reliability that is greater than that of the storage area in which the data of this overlapped part is stored.

In one embodiment, a large number of files is stored in the above-mentioned plurality of storage areas. The above-mentioned overlap retrieval means can retrieve the above-mentioned overlap files from among a number of files, which is smaller than the number of above-mentioned stored files. Here, "large number of" can be taken to mean more than "a plurality of".

In one embodiment, a storage control system can comprise means for reading a file from at least one storage area; and file marking means, which, each time a file is read out, marks the file that has been read out, and controls the number of marked files to a number less than the above-mentioned number of stored files. The above-mentioned overlap retrieval means can retrieve a file that is an overlap of a certain file from among a plurality of marked files.

In one embodiment, the above-mentioned overlap retrieval means can determine, sequentially from the most recently marked file, whether or not a file from among the above-mentioned marked plurality of files overlaps the above-mentioned certain file.

In one embodiment, the above-mentioned overlap retrieval means can retrieve a file, which overlaps the above-mentioned certain file, from among one or more files for which either the entire or a part of the filename, and/or the file size matches that of the above-mentioned certain file, when the above-mentioned file, which are overlapped, are not found among the above-mentioned marked plurality of files.

In one embodiment, a reliability storage region can also be provided. This storage region is capable of storing reliability information related to the reliability of each storage areas. When two files are completely matched one another, the above-mentioned storage control means can make a determination based on the above-mentioned reliability information as to which file resides in the storage area with the highest reliability, and can release the location of the file that resides in the storage area with low reliability, and leave the file that is in the high-reliability storage area.

In one embodiment, a reliability storage region, which is capable of storing reliability information related to the respective reliability of a plurality of storage areas, can also be provided. When old and update files partially overlap one another, the above-mentioned storage control means, based on the above-mentioned reliability information, can store the update file in a storage area that is more reliable than the storage area in which the old file is stored, generate a difference file of the old and update files, store the above-mentioned difference file in at least one storage area, and release the location where at least the data of the overlapped parts of the above-mentioned old file reside. The difference file referred to here, for example, can be used as a difference File Based on a New File (difference File (BNF)), which will be explained hereinbelow.

In one embodiment, log file updating means for writing information related to the above-mentioned retrieved overlap files into a prescribed log file can also be provided. The above-mentioned overlap retrieval means can retrieve the above-mentioned overlap files based on information stored in the above-mentioned log file.

In one embodiment, the above-mentioned storage control system can also be connected to another storage control system so as to enable communications. The above-mentioned storage control means, by transferring all the files in a primary storage area of the above-mentioned plurality of storage areas to the above-mentioned another storage control system, can copy the above-mentioned all of the files to a secondary storage area accessible by the above-mentioned separate storage control system, and thereafter, when a certain file of the above-mentioned primary storage area is updated, can transfer at least the metadata of the update file to the above-mentioned separate storage control system.

More specifically, for example, storage control means of the above-mentioned storage control system can transfer an update file itself and file metadata to a separate storage control system. In this case, storage control means of the separate storage control system receives an update file and metadata of that file, and, in accordance with the received file-metadata, can write the received update file to the above-mentioned secondary storage area.

Further, for example, separate storage control means of the above-mentioned storage control system can, on the basis of an old file and an update file, generate a difference file Based on an Old File (difference File (BOF)), which will be explained hereinbelow, for generating an update file based on an old file, and, in addition, can transfer the difference file (BOF) to the above-mentioned another storage control system. In this case, the above-mentioned another storage control means receives the difference file (BOF), generates an update file on the basis of the received difference file (BOF) and the old file residing in the above-mentioned secondary storage area, and can store the generated update file in the above-mentioned secondary storage area in accordance with the received file-metadata.

In one embodiment, the above-mentioned storage control system can be connected, so as to enable communications, to a backup device for acquiring a file stored in at least one storage area, and backing it up in a backup storage area. The above-mentioned storage control system can further comprise means for hiding the above-mentioned retrieved overlap file from the above-mentioned backup device.

In one embodiment, the above-mentioned storage control means can generate a metadata aggregate file in which is recorded a large number of file-metadata corresponding to a respective large number of files stored in the above-mentioned plurality of storage areas, store the above-mentioned generated metadata aggregate file in at least one storage area, and send the above-mentioned stored metadata aggregate file to the above-mentioned backup device, thereby enabling restoration based on the file-metadata recorded in the above-mentioned metadata aggregate file.

In one embodiment, the above-mentioned storage control means can create a physical address image file (raw-image file) of at least one physical address image from among the above-mentioned plurality of storage areas, and send the above-mentioned created raw-image file to the above-mentioned backup device.

In one embodiment, the above-mentioned storage control means can back up at least one overlapped part of the above-mentioned retrieved overlap files in a storage area that has higher reliability than the storage area in which this overlapped part data is stored.

In one embodiment, when a backup source file is updated after the above-mentioned backup, the above-mentioned storage control means can reflect the results of this update in the backup destination.

In one embodiment, a storage control system can comprise a threshold value storage region for storing a threshold value for the number of files, which are overlapped, and means for prompting a user to delete unnecessary overlap files when the number of the above-mentioned retrieved overlap files becomes greater than the above-mentioned threshold value.

A storage control system according to a second aspect of the present invention comprises overlap retrieval means for retrieving overlap files, which overlap one another, from among a number of files that is less than the number of files stored in a plurality of storage areas; and controlling means for carrying out prescribed processing for the above-mentioned retrieved overlap files.

The above-mentioned means can be realized using components, such as hardware, computer programs or a combination thereof. Computer programs can either be downloaded via a communications network, or read from storage media, such as CD-ROM or DVD (Digital Versatile Disk). Further, the processing for implementing the respective means can either be carried out using one component, or a plurality of components.

A storage control system according to a third aspect of the present invention comprises at least one storage region (for example, memory), and at least one processor. The above-mentioned at least one processor read files from at least one storage device of the plurality of storage devices in which a large number of files are stored, and each time a file is read, marks the read file on the above-mentioned storage region, and controls the number of marked files to a number that is less than the number of files stored in the above-mentioned plurality of storage devices, retrieves a file that is an overlap of a certain file from among the marked plurality of files, and stores data of at least one overlapped part of the above-mentioned retrieved overlap files in a storage device that has reliability, which is greater than that of the storage device in which the data of this overlapped part is stored.

A processor, for example, can be a microprocessor, which reads in and executes a computer program.

A storage device can either be a physical storage device (for example, a hard disk), or a logical storage device (for example, a logical unit or a logical volume).

BRIEF DESCRIPTION OF THE DRAWINGS

FIG. 3A shows an example configuration of a storage management table 51;

FIG. 3B shows an example configuration of a reliability comparison table 55;

FIG. 7 shows one example of a file read process flow when an overlap data area is not released;

FIG. 20A shows an overview of an information processing system related to a third embodiment of the present invention;

FIG. 20B is a schematic diagram of an example of processing carried out in a third mode;

FIG. 23 is an example of a more detailed description of the overview of the processing flow shown in FIG. 22; and FIG. 24 shows an example of a variation of the information processing system related to the first embodiment of the present invention.

DETAILED DESCRIPTION OF THE PREFERRED EMBODIMENT

A number of embodiments of the present invention will be explained below by referring to the figures.

Embodiment 1

Figure 1:
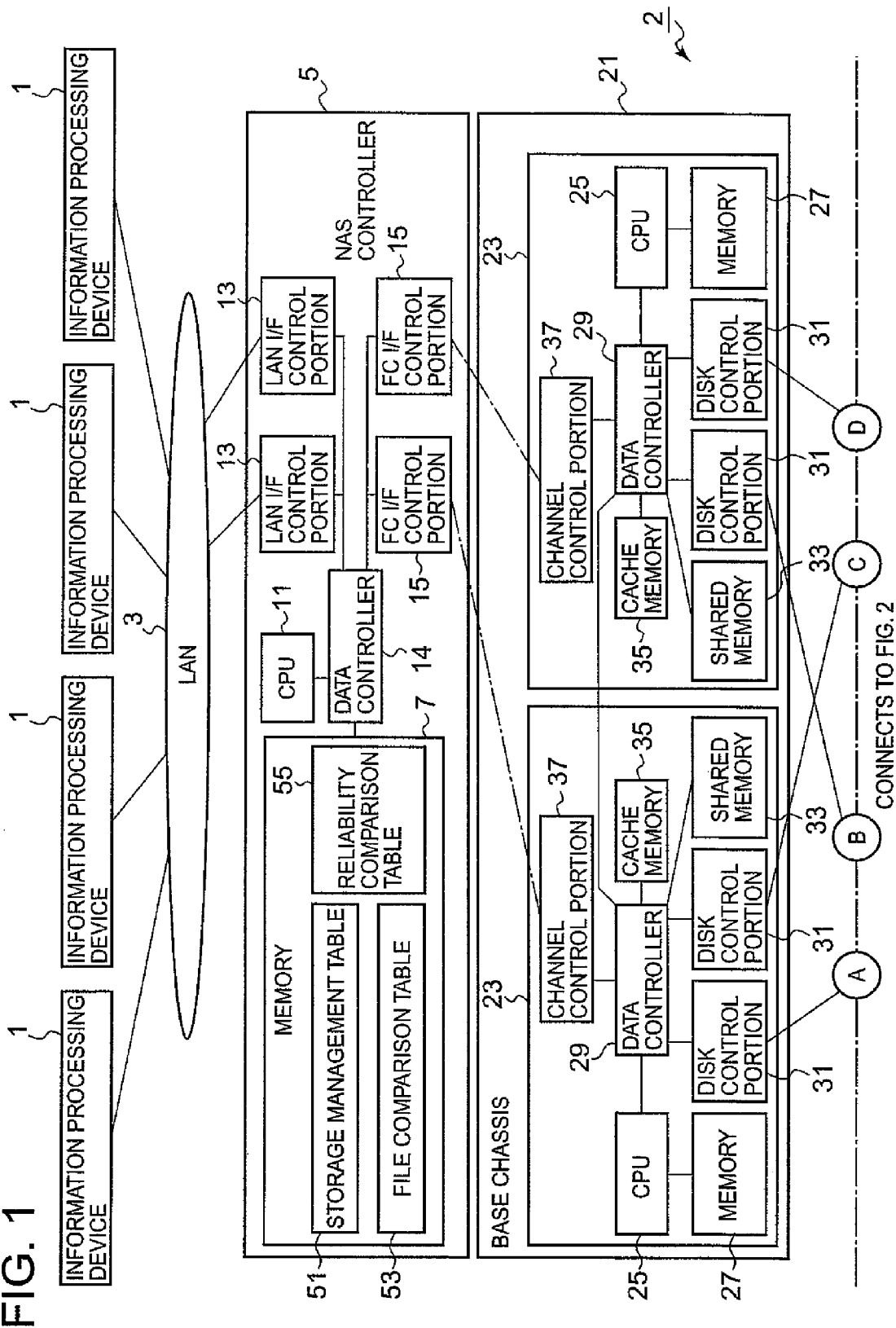
FIG. 1 shows one portion of an information processing system having a NAS controller to which a storage control system related to a first embodiment of the present invention is applied.
Figure 2:
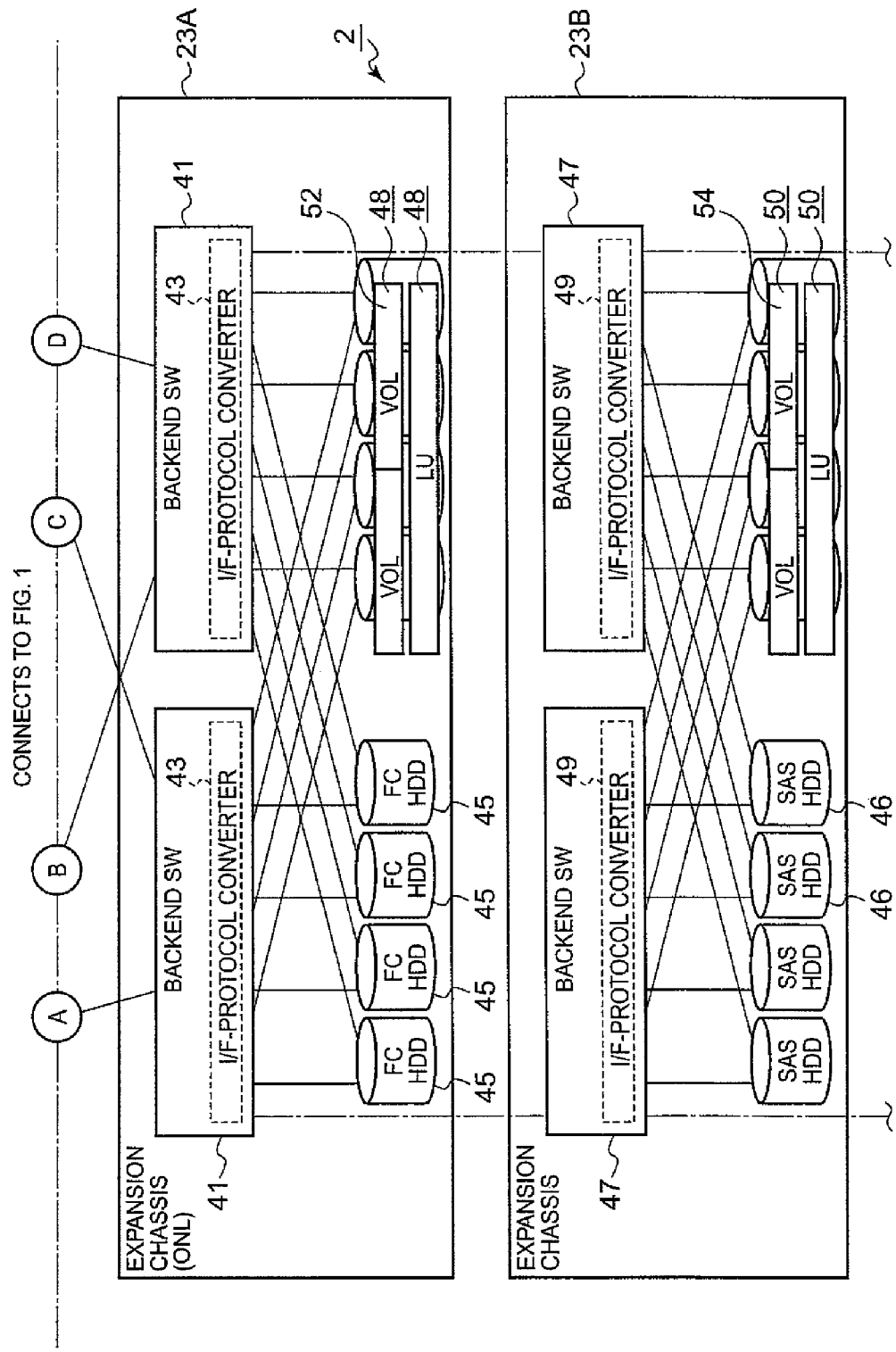
FIG. 2 shows one portion of the remainder of the information processing system related to the first embodiment of the present invention.

FIGS. 1 and 2 show an information processing system that has a NAS controller to which a storage control system related to a first embodiment of the present invention is applied. Connecting FIGS. 1 and 2 produces a single information processing system. In the following explanation, there will be times when an explanation will use only the parent number when any of the same type of component will do, and times when an explanation will append a branch numeral to a parent number when distinguishing between the same type of component. Also, in order to make an explanation easier to understand, there will also be times when an explanation will not use a branch numeral even when a branch numeral is appended in a figure.

As shown in FIG. 1, a plurality of units (even one unit is fine) of information processing devices 1, and a NAS (Network Attached Storage) controller 5 are connected to a LAN (Local Area Network) 3 (a WAN (World Area Network) or other such communications network can also be used).

The respective information processing devices 1, for example, are computer devices (for example, personal computers) comprising hardware resources, such as a CPU, memory and display device. An information processing device 1 can issue a read command for data to be read, or a write command for data to be written in to a NAS controller 5 (There will be times hereinbelow when a read command and write command will be referred to generically as "access request"). The respective information processing devices 1 can send file level access requests.

A storage device system 2 is connected to the NAS controller 5 so as to enable communications via a prescribed communications interface. The NAS controller 5, for example, can be constituted from either one or a plurality of circuit boards. The NAS controller 5, for example, comprises a CPU 11, two LAN I/F control portions (for example, LAN interface devices) 13, 13, which are connected to a LAN 3, and two FC I/F control portion (for example, FC interface devices) 15, 15, which are connected to the storage device system 2 via fibre channels (FC) (There can be either more or less than two LAN I/F control portions 13 and FC I/F control portions 15). The NAS controller 5, for example, also comprises a data controller 14 for controlling the transfer of data between the respective LAN I/F control portions 13, CPU 11, memory 7, and respective FC I/F control portions 15, and memory 7 for enabling various information to be stored. The CPU 11, for example, can convert a file level access request received from an information processing device 1 to a block level access request, and send this block level access request to the storage device system 2. Memory 7, for example, can have a control area for storing control information for controlling the operation of the NAS controller 5, and a cache area for temporarily storing data exchanged between an information processing device 1 and logical volumes 52, 54, which will be explained hereinbelow. The control area of memory 7, for example, can store a storage management table 51, reliability comparison table 55 and file comparison table 53. These tables will be explained in detail below.

The storage device system 2, for example, comprises a plurality of chassis connected in series. The plurality of chassis, for example, comprise a base chassis 21, and one or more expansion chassis 23, 23 . . . The expansion chassis located at the end of the one or more expansion chassis 23, 23, . . . connected in series is connected directly to the base chassis 21, and the other expansion chassis are connected so as to be able to communicate with the base chassis 21 by way of one or more expansion chassis. In order to make the explanation hereinbelow easier to understand, the number of expansion chassis 23 will be set at two units (Furthermore, neither the number of base chassis nor the number of expansion chassis is limited to the examples of FIG. 1 and FIG. 2.)

The base chassis 21, for example, comprises duplexed disk controllers 23, 23. Each disk controller 23 can receive a block level access request from the NAS controller 5, and control the input and output of data relative to logical units 48, 50 explained hereinbelow in accordance with this access request. For example, a CPU 25, memory 27, data controller 29, channel control portion 37, disk control portion 31, cache memory 35 and shared memory 33 are provided in each disk controller 23.

Data sent and received between the channel control portion 37 and disk control portion 31 (in other words, data exchanged between an information processing device 1 and the logical units 48, 50 described hereinbelow) is temporarily stored in cache memory 35.

Control information, such as, for example, a table for expressing the correspondence of a LUN and an HDD number, is recorded in memory 27.

The channel control portion 37 can send and receive data and control signals to and from the NAS controller 5. The disk control portion 31, for example, can send and receive data and control signals for exchange between HDD 45, 46 in accordance with a commonly known protocol (e.g. the fibre channel protocol).

The data controller 29 is connected to other data controllers 29 so as to enable communications, thus making possible the exchange of data with other data controllers 29. The data controller 29 can control the transfer of data between the CPU 25, channel control portion 37, disk control portion 31, cache memory 35, and shared memory 33.

The CPU 25 can execute a variety of information processing. For example, when a block-level read command is received from the NAS controller 5, the CPU 25 can reference control information stored in memory 27, generate a request for reading out the read-targeted data, which is written in logical volumes 52, 54 corresponding to a volume ID specified in this read command, and send this request by way of the disk control portion 31. By so doing, the CPU 25 reads out the read-targeted data to cache memory 35, and thereafter, reads this read-targeted data from cache memory 35 and sends it to the NAS controller 5. Further, for example, when a block-level write command and write-targeted data are received from the NAS controller 5, the CPU 25 temporarily stores the write-targeted data in cache memory 35, and can reference control information stored in memory 27, generate, based on this write command, a request for writing the write-targeted data to logical volumes 52, 54 corresponding to the volume ID specified in this write command, and send this request by way of the disk control portion 31. By so doing, the CPU 25 can write the write-targeted data stored in cache memory 35 to the logical volumes 52, 54 specified by this write command.

As shown in FIG. 2, either the same or different devices can be mounted in the respective expansion chassis 23A, 23B. In this embodiment, the expansion chassis nearest the base chassis 21 (in this embodiment, 23A) comprises duplexed backend switching devices (hereinafter referred to as backend SW) 41, 41, and a plurality of physical storage devices 45, 45, . . . connected to both backend SW 41, 41. The expansion chassis furthest from the base chassis 21 (in this embodiment, 23B) comprises duplexed backend SW 47, 47, and a plurality of physical storage devices 46, 46, . . . connected to both backend SW 47, 47. For example, at least two or more of the plurality of physical storage devices 45, 45, . . . , or at least two or more of the plurality of physical storage devices 46, 46, . . . , can be placed into a single group conforming, for example, to a RAID (Redundant Arrays of Inexpensive Disks) system.

The respective backend SW 41 of expansion chassis 23A are connected to the respective disk control portions 31 of the respective disk controllers 23, and to backend SW 47 of the other expansion chassis 23B. This makes it possible for the disk controller 23 to access the physical storage devices 46 inside the expansion chassis 23B, which is located farther away than expansion chassis 23A, by way of the backend SW 41, 47.

The respective backend SW 41, 47 comprise I/F-protocol converters 43, 49. A block-level access request from a disk controller 23 is converted to an access request of a format best suited for a physical storage device 45, 46 by this I/F-protocol converter 43, 49, making it possible to write or read data to or from a physical storage device 45, 46.

A physical storage device 45 inside expansion chassis 23A, for example, is used for storing data, which is written and read online. Further, a physical storage device 46 inside expansion chassis 23B, for example, is used for storing data, which is written and read near-line (for example, batch processing done at night). The physical storage devices 45, 46 in this embodiment are hard disk drives (hereinafter referred to as HDD), but the present invention is not limited to [HDD], and, for example, other types of drive devices capable of mounting optical disks, magnetic tapes or semiconductor memory can also be used. Further, the reliability (or performance) of the physical storage devices 45 provided in the expansion chassis nearest the base chassis 21 can be made higher than the reliability (or performance) of the physical storage devices 46 provided in the expansion chassis furthest from the base chassis 21. More specifically, for example, a physical storage device 45 can be an FC interface (hereinafter I/F) HDD (hereinafter FC HDD). Conversely, a physical storage device 46 can be a SAS (Serial Attached SCSI) I/F HDD (hereinafter SAS HDD). All of a plurality of physical storage devices 46 can be SAS HDD, or, instead, can be SATA (Serial ATA) I/F HDD, or can be a combination of SAS HDD and SATA HDD.

A plurality of FC HDD 45, or a plurality of SAS HDD 46, for example, can also be arranged in an array. Either one or a plurality of logical units (hereinafter, also referred to as LU) can be established in at least one of the plurality of FC HDD 45. Similarly, either one or a plurality of LU can be established in at least one of the plurality of SAS HDD 46. (Hereinafter, the reference number of LU on FC HDD 45 will be "48", and the reference number of LU on SAS HDD 46 will be "50".) The logical storage areas provided by the respective LU 48, 50 can be further partitioned into a plurality of sub-areas 52, 54. These partitioned sub-areas are called "logical volumes" in this embodiment.

The above is an overview of the information processing system in this first embodiment. Next, the various tables 51, 55 and 53 stored in the memory 7 of the NAS controller 5 will be explained. Furthermore, in the following explanation, deleting both a file and the file-metadata corresponding thereto will be referred to as "deleting an entire file", and when a file is deleted, but the file metadata is left, this will be referred to as "releasing the storage area in which the file resides". Also, in the following explanation, files in which either all the data or a part of the data overlap one another will be referred to as "overlap files" (e.g. stated differently "duplicate files"), and data corresponding to mutually overlapped parts will be referred to as "overlap data". Therefore, for example, when either all or a part of a first file and a second file overlap one another, both the first file and the second file are "overlap files" having "overlap data" (e.g. stated differently "duplicate data"). Hereinbelow, referring to a file simply as an "overlap file" will denote two files have overlap data, and when specifying either one of these files, for example, an expression capable of clearly distinguishing the two, such as "one overlap file" and "the other overlap file" will be utilized.

FIG. 3A shows an example configuration of a storage management table 51.

A storage management table 51 is one type of file-metadata group. A storage management table 51 contains records (file-metadata) comprising various information related to each file stored in either physical storage device 45 or 46 of the storage device system 2. As the various information related to a single file (for the sake of convenience, this is referred to as "file Z" hereinbelow), for example, there are volume ID, path name, filename, data length, attribute information, and information of data location for reference (reference location information). Volume ID is the identifier of the logical volume in which file Z is stored. Path name is the name denoting the access path to file Z. Filename is the name of file Z. Data length is the data length of file Z. Attribute information is information denoting attributes related to file Z, for example, the timestamp (e.g. date and time) of updating. Reference location information is information indicating the place where one or more block data corresponding to file Z exist (in other words, a so-called pointer), and, for example, comprises a physical device ID, LUN, TOP LBA, used data length, and link table. A physical device ID is the identifier of an expansion chassis comprising LU for storing one or more block data. LUN is the number of the LU for storing one or more block data. A top LBA is the logical block address denoting the location of the beginning data block of one or more data blocks. Used data length is the data length resulting from one or more data blocks. The one or more data blocks corresponding to file Z can be specified using the top LBA and used data length. Furthermore, when file Z is a file that partially overlaps another file, the used data length becomes the data length of this overlapped part. A link table can set an additional either one or a plurality of reference location information for file Z. (In the case of a difference file (BNF) or difference file (BOF), which will be explained below, file Z can comprise other types of information to be described hereinbelow.) The total of all used data lengths included in the reference location information of file Z constitutes the file Z data length.

Every time a new file is stored in a physical storage device 45, 46, the CPU 11 of the NAS controller 5 can add a new record corresponding to this new file to the storage management table 51. Further, every time a file is deleted from a physical storage device 45, 46, the CPU 11 deletes the record corresponding to the deleted file from the storage management table 51, thereby also making it possible to delete the entire file. Further, when a storage area in which either all or a part of one overlap file is released, the CPU 11 can update prescribed information inside the record corresponding to this overlap file (that is, the file-metadata) without deleting this record.

FIG. 3B shows an example configuration of a reliability comparison table 55.

Various information related to the respective logical units 48, 50 provided in the storage device system 2 are registered in a reliability comparison table 55. As the various information related to one logical unit (for the sake of convenience, this is referred to a "logical unit Z" hereinbelow), for example, there are a physical device ID, LUN, RAID level, number of HDD units, HDD type, free capacity, device mount date/time, and reliability ranking. A physical device ID is the identifier of a physical device having logical unit Z. LUN is the logical unit Z number. RAID level denotes the RAID level of the RAID group (HDD group) having logical unit Z. The number of HDD units is information indicating how many HDD logical unit Z is being provided by. HDD type denotes the classification of the one or more HDD having logical unit Z (for example, FC HDD or SAS HDD) (When a plurality of types of HDD are intermixed in these one or more HDD, a plurality of HDD type codes are recorded.) Free capacity denotes the storage capacity of an area of the storage capacity of logical unit Z in which data is not stored (in other words, a released area). The device mount date/time denotes the date and time at which the HDD group having logical unit Z was mounted in an expansion chassis 23 (or, the date and time at which this expansion chassis 23 was connected so as to be able to communicate with the base chassis 21). Reliability ranking denotes the level of logical unit Z reliability. With regard to the reliability ranking, the higher the reliability, the lower the number. A different reliability ranking is set for each logical unit. (The same reliability ranking can also be set for another logical unit.) For example, when at least one of the RAID level and HDD type of a plurality of logical units is the same, either the same reliability ranking or a different reliability ranking can be set for these respective plurality of logical units. For example, the NAS controller 5 CPU 11 determines the reliability ranking by valuing the respective components based on at least one of the physical device ID, LUN, RAID level, number of HDD, HDD type, free capacity or device mount date/time each time the system administrator changes the configuration. (Subsequent to this determination, the reliability ranking can be set with or without the approval of the administrator.) Here, for example, when reliability valuing is carried out based on RAID level, the reliability ranking can become lower in the order of RAID 6+1>RAID 3+1, 4+1 or 5+1>RAID 1>RAID 0+1>RAID 6>RAID 3, 4 or 5>RAID 0. (That is, as one example, RAID 6+1 can be highest, and RAID 0 can be the lowest.) Also, for example, when the valuing is carried out based on HDD type, the reliability ranking becomes lower in the order of FC>SAS. Further, for example, when the valuing is carried out based on both RAID level and HDD type, as one example, the reliability ranking can be determined on the basis of the average value of a reliability ranking determined from the standpoint of the RAID level, and a reliability ranking determined from the standpoint of HDD type (When the average value is the same, the reliability ranking can be determined based on whichever standpoint takes precedence.).

Figure 4:
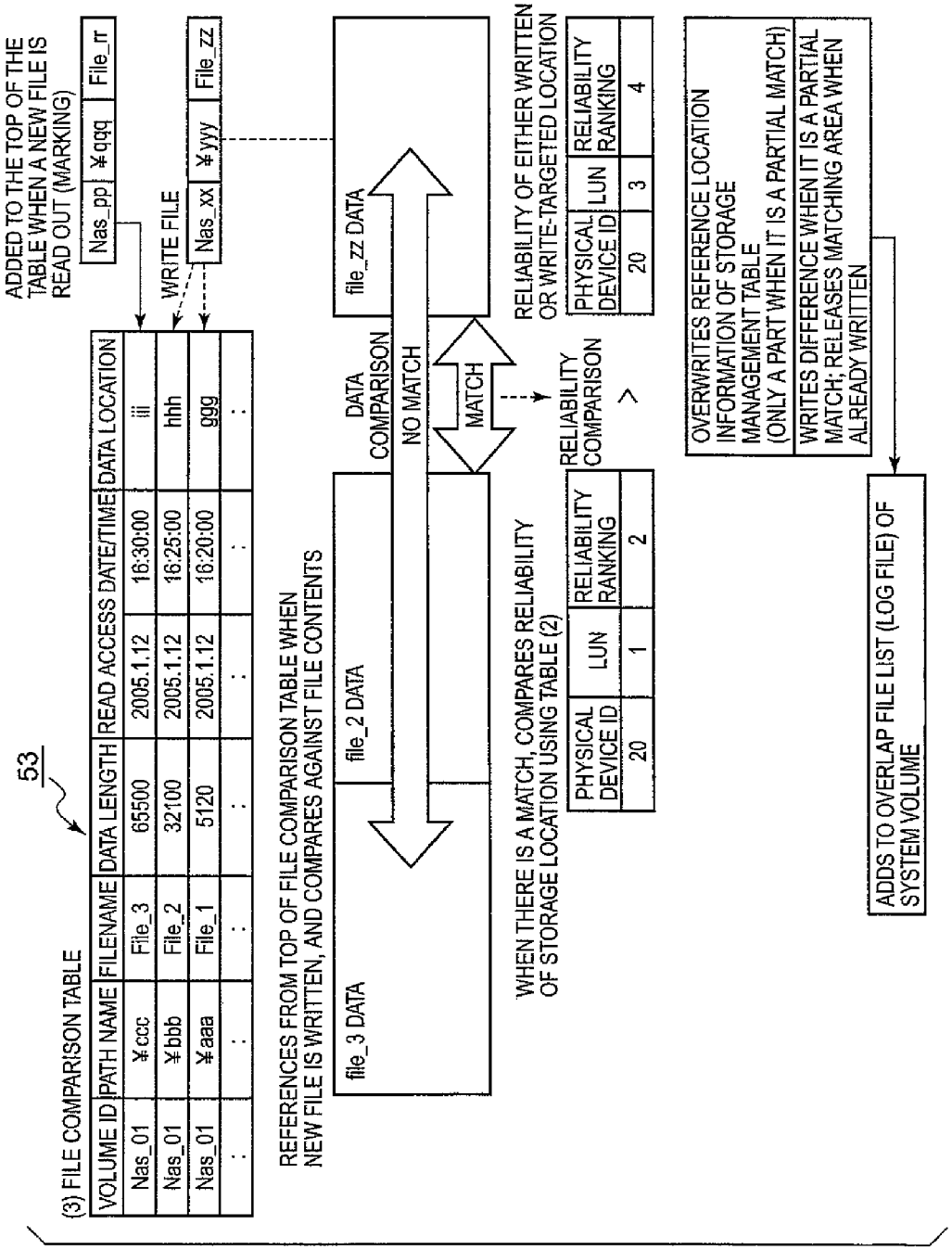
FIG. 4 shows an example configuration of a file comparison table 53, and one example of an information processing flow that utilizes this table 53.

FIG. 4 shows an example configuration of a file comparison table 53, and an example of one information processing flow that utilizes this table 53.

A file comparison table 53 contains records comprising various information related to each file read from either physical storage device 45 or 46. As the various information related to a single file that has been read (for the sake of convenience, this is referred to as "file Y" hereinbelow), for example, there are volume ID, path name, filename, data length, read access timestamp (date/time), and data location. Volume ID, path name, filename, and data length are the same as those registered in storage management table 51. Read access date/time denotes the date and time that file Y was read. Data location is location information denoting where file Y is stored in cache memory 35, and/or where records corresponding to file Y are located in the storage management table 51.

Every time a file is read from a physical storage device 45, 46, the CPU 11 of the NAS controller 5 can add a new record corresponding to this read file at the head of the file comparison table 53, causing the positions of the already existing records to drop down one, respectively. Thus, file-related records are listed in the file comparison table 53 in order of read date and time from top to bottom beginning with the most recent date and time. Then, when a predetermined number of records has been registered in the file comparison table 53, the CPU 11 can delete the oldest record from the file comparison table 53 when the most recent records is newly registered.

The preceding has been an explanation of the file comparison table 53. Furthermore, as mentioned hereinabove, this FIG. 4 also shows an example of an information processing flow that uses this table 53, but since this explanation will be easier to understand once an overview of the processing performed by this embodiment has been explained, this flow will be explained later by referring to this FIG. 4 once again.

An overview of the processing, which the NAS controller 5 (for example, its CPU 11) carries out in this embodiment, will be explained below.

Figure 5A:
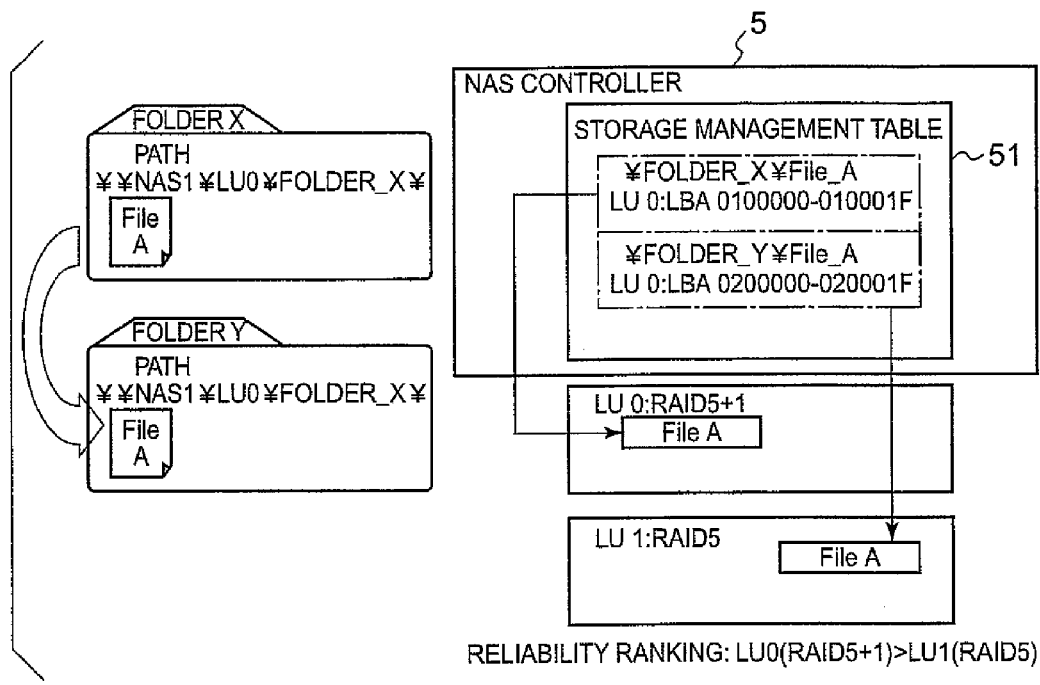
FIG. 5A is a schematic diagram of processing for copying a file A in folder X to folder Y.

FIG. 5A is a schematic diagram of processing for copying a file A in folder X to folder Y.

It is supposed that folder X resides in LU0, and that folder Y resides in LU1, which has a lower reliability ranking than LU0. Here, "LU1 has a lower reliability ranking than LU0" refers to the fact that the RAID level of LU1 (for example, RAID 5) is lower than the RAID level of LU0 (for example, RAID 5+1). Of course, this embodiment is not limited to this. For example, it could also be a case in which an LU1 HDD (for example, a SAS HDD) has a lower reliability ranking than an LU0 HDD (for example, an FC HDD).

The NAS controller 5 can copy file A in folder X to folder Y in accordance with instructions from an information processing device 1 (or automatically without receiving these instructions). More specifically, for example, the NAS controller 5 can read file A from folder X by issuing a file read command, and thereafter, can write the read file A to folder Y by issuing a file write command, thereby copying file A in folder X to folder Y. The NAS controller 5 can add the file-metadata related to the read file A at the top of the reliability comparison table 53, and can add the new file-metadata related to the copy of file A generated in folder Y (for example, a record comprising the reference location information of the data making up this file A) to the storage management table 51.

As explained hereinabove, the NAS controller 5 can store one or a plurality of copies of at least one file in storage resources provided by a plurality of HDD 45, 46 (hereinafter HDD storage resources). Also, for example, subsequent to the generation of a second file, which is a copy of a first file, at least one of the first file and second file is updated, with the result that the first file and the second file, which had been complete overlaps, now become partial overlaps. As this process is repeated, a large amount of overlap data comes to reside in the HDD storage resources.

In this embodiment, based on the reliability of the LU, it is possible to leave (or save) at least one or more of a plurality of overlap data, and to free up storage area by releasing storage areas in which other overlap data exists. This processing will be explained hereinbelow. Furthermore, in the following explanation, there will be instances when, among the overlap files, a file stored subsequent to this processing will be called a "update file" (e.g. stated differently "post-update file"), and a file stored prior to this processing will be called a "old file" (e.g. stated differently "pre-update file").

Figure 5B:
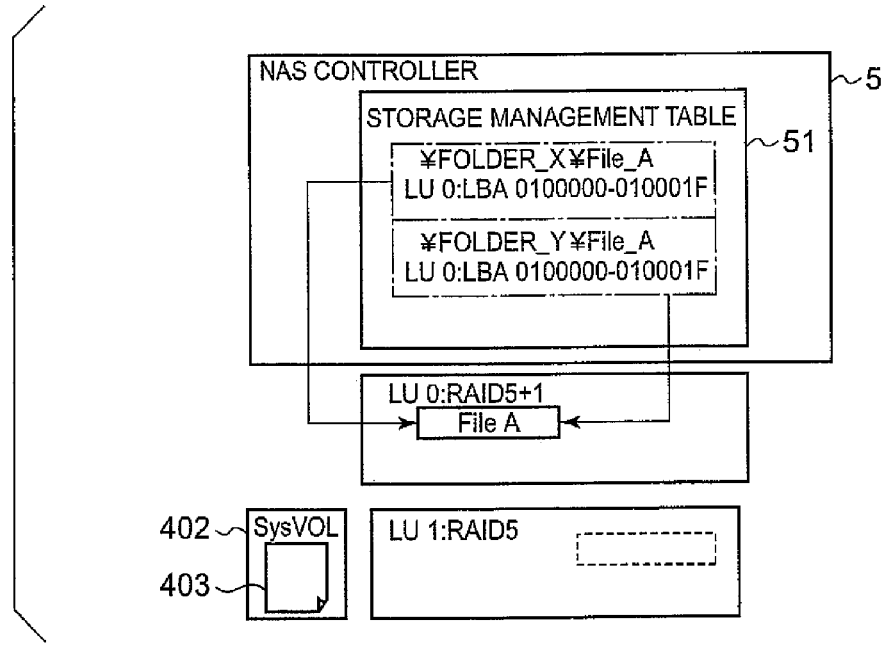
FIG. 5B is a conceptual view of one example of releasing an overlap data area.

FIG. 5B is a conceptual view of an example of releasing an overlap data area.

By carrying out the processing shown in FIG. 5A, file A resides in both LU0 and LU1. That is, the file A, which resides in LU0, and the file A, which resides in LU1, completely overlap one another.

In this case, the CPU 11 of the NAS controller 5 specifies the reliability ranking of LU0 and LU1, respectively, by referencing the reliability comparison table 55. Thus, CPU 11 can specify that a higher reliability ranking has been allocated to LU0 than to LU1.

In this case, CPU 11 releases the storage area in which the file A overlap data (in other words, the file A itself here) exists in LU1, which has a low reliability ranking, and leaves the file A in LU0, which has a high reliability ranking. Also, in line with releasing the storage area of the overlap data from LU1, CPU 11 makes the reference location information in the file-metadata corresponding to this LU1 file A (the information in the storage management table 51) the same information as that of the reference location information in the file-metadata corresponding to the LU0 file A without changing the path name. Thus, CPU 11 can show information processing device 1 that file A exists no matter which of folder X or folder Y is referenced. However, the data corresponding to this file A will be read out from LU0 no matter which of folder X or Y is read.

Further, the CPU 11 records a log relating the fact that a storage area of overlap data was cleared from LU1 in an overlap file list 403 residing in a system volume 402. System volume 402 and overlap file list 403 will be explained in detail further below.

Figure 6A:
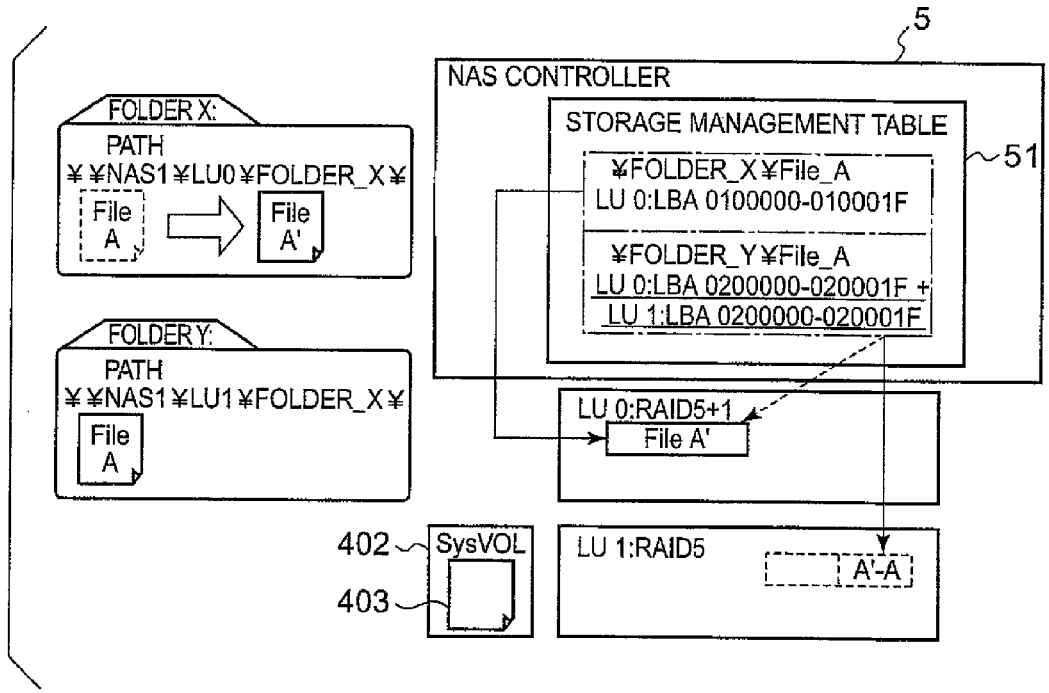
FIG. 6A is a conceptual view of another example of releasing an overlap data area.

FIG. 6A is a conceptual view of another example of releasing an area of overlap data. Mainly the points of difference with FIG. 5B will be explained below, and explanations of the points these two figures have in common will either be omitted or simplified.

By carrying out the processing shown in FIG. 5A, file A resides in both LU0 and LU1. Then, it is supposed that file A is updated thereafter. The updated file A will be called "file A'". Post-update file A' resides in LU0, and old file A resides in LU1.

In this case, the CPU 11 of the NAS controller 5 can detect via a prescribed method the fact that the update file A' residing in LU0 and the old file A residing in LU1 partially overlap one another. For example, this can be detected using an algorithm, which determines either the LCS (Longest Common Subsequence) or the SED (Shortest Edit Distance). Further, CPU 11 can also specify which block data, among a plurality of block data corresponding to update file A' and two or more block data corresponding to old file A, is an overlapped part, and which block data is not an overlapped part.

The CPU 11 makes a determination as to whether or not update file A' resides in an LU, which has a higher reliability ranking than old file A. When a negative determination is achieved as a result of this, the CPU 11 can cause the update file A' to migrate to an LU, which has a higher reliability ranking. (At this time, the reference location information of the file metadata of the update file A' can be updated to information denoting the migration-destination location without changing the path name.) In the example of FIG. 6A, since the update file A' resides in an LU with a higher reliability ranking that the old file A, migration need not be performed.

Further, based on the update file A' and the old file A, the CPU 11 produces a difference file A'-A for restoring the old file A using the update file A'. Herein below, a difference file for restoring an old file on the basis of an update file means a difference file, which is obtained based on an update file (a new file), and will be called a difference file based on a new file. Conversely, a difference file for restoring an update file on the basis of an old file means a difference file, which is obtained based on an old file, and will be called a difference file based on an old file.

The difference file based on a new file (difference file (BNF)) and difference file based on an old file (difference file (BOF)) will be explained in detail below. It is supposed that 514-bytes of overlap data, and 800-bytes of non-overlap data following after the overlap data (hereinafter, old original data) are included in the old file A at this time. It is also supposed that the same overlap data as above (that is, 514-bytes of overlap data), 50-bytes of non-overlap data added in front of this overlap data (hereinafter, new original data), and 1,000-bytes of new original data following after this overlap data are included in the update file A'.

In this case, the difference file (BNF) A'-A is a file comprising the information required for restoring the old file A from this difference file (BNF) A'-A and the update file A'. More specifically, for example, the difference file (BNF) A'-A comprises a header, overlap data length, offset information behind of overlap data, and old original data information. The header comprises an offset, which denotes how many bytes of new original data there is in front of the first overlap data, in other words, how many bytes need to be skipped from the head of the update file A' to be able to reference overlap data (in this example, 50 bytes). The overlap data length is information denoting the data length of the first overlap data (in this example, "514 bytes"). Offset information behind of overlap data comprises an offset, which denotes how many bytes need to be skipped from the end of the first overlap data to be able to reference the next overlap data, and the data length of the subsequent overlap data. (Since there is only one overlap data in this example, the offset is "0" (or null), and the overlap data length is "0 bytes".) Old original data information, for example, comprises the old original data itself. Further, old original data information can also comprise an offset for showing at what location from the head of the old file A this old original data is entered. Old original data and offset can also be configured as a single set. The number of sets can be the same as the number of old original data. In this example, there is one set, and this set can comprise 800-bytes of old original data, and the offset "514 bytes" indicating the location of this old original data.

File-metadata of this kind of difference file (BNF) A'-A is also recorded in the storage management table 51. At this time, for example, information related to the header, overlap data length, offset information behind of overlap data, and old original data information of the difference file (BNF) A'-A (for example, the locations in the difference file (BNF) A'-A) can also be defined in the link table inside this file-metadata.

The CPU 11 of the NAS controller 5 can restore the old file A based on the above-mentioned difference file (BNF) A'-A and post-update file A'. More specifically, for example, the CPU 11 can specify overlap data from the update file A' by referencing the header, overlap data length, and offset information behind of overlap data of the difference file (BNF) A'-A. The CPU 11 can also specify old original data in the difference file (BNF) A'-A by referencing the old original data information of the difference file (BNF) A'-A. The CPU 11 can restore the old file A by combining the specified overlap data and old original data on the basis of the old original data information of the difference file (BNF) A'-A.

Next, a difference file based on an old file (difference file (BOF)) will be explained. A difference file (BOF) A-A' is a file comprising information required for restoring an update file A' from this difference file (BOF) A-A' and an old file A. More specifically, for example, the difference file (BOF) A-A' comprises a header, overlap data length, offset information behind of overlap data, and new original data information. The header comprises an offset (in this example, "0"), which denotes how many bytes of old original data are in front of the first overlap data, in other words, how many bytes need to be skipped from the head of the old file A to be able to reference overlap data. The overlap data length is information, which denotes the data length of the first overlap data (in this example, "514 bytes"). Offset information behind of overlap data comprises an offset, which denotes how many bytes need to be skipped from after the first overlap data to be able to reference the next overlap data, and the data length of the next overlap data. (In this example, since there is only one overlap data, the offset is "0" (or null), and the overlap data length is "0 bytes".) New original data information, for example, comprises a set of new original data itself, and which location from the head of the update file A' this new original data is entered. The number of these sets can be the same as the number of new original data. In this example, there are two sets. The first set comprises 50-bytes of new original data, and offset "0" denoting the location of this new original data. The second set comprises 1,000-bytes of new original data, and the offset "564 bytes" denoting the location of this new original data.

The CPU 11 of the NAS controller 5 can restore the update file A' on the basis of the above-mentioned difference file (BOF) A-A' and the old file A. More specifically, for example, the CPU 11 can specify overlap data from the old file A by referencing the header, overlap data length, and offset information behind of overlap data of the difference file (BOF) A-A'. The CPU 11 can also specify new original data in the difference file (BOF) A-A' by referencing the new original data information of the difference file (BOF) A-A'. The CPU 11 can restore the update file A' by combining the specified overlap data and new original data on the basis of the new original data information of the difference file (BOF) A-A'.

The explanation will return to FIG. 6A. The CPU 11 writes the difference file (BNF) A'-A to LU1, and clears the storage area in which the old file A resides (the storage area in LU1). Pursuant to this processing, the CPU 11 updates the file-metadata related to the old file A in folder Y on LU1. More specifically, for example, the CPU 11 makes the reference location information for the overlap data in the old file A the same as the reference location information for the overlap data in the update file A' (in other words, it sets information denoting the location of overlap data in LU0), and makes it the reference location information denoting the location in LU1 for the old original data in the old file A (more specifically, the old original data in the difference file (BNF) A'-A) (and adds a link table denoting this information).

Further, the CPU 11 records a log relating the fact that the storage area in which the old file A resides was cleared from LU1 in an overlap file list 403 in a system volume 402.

Figure 6B:
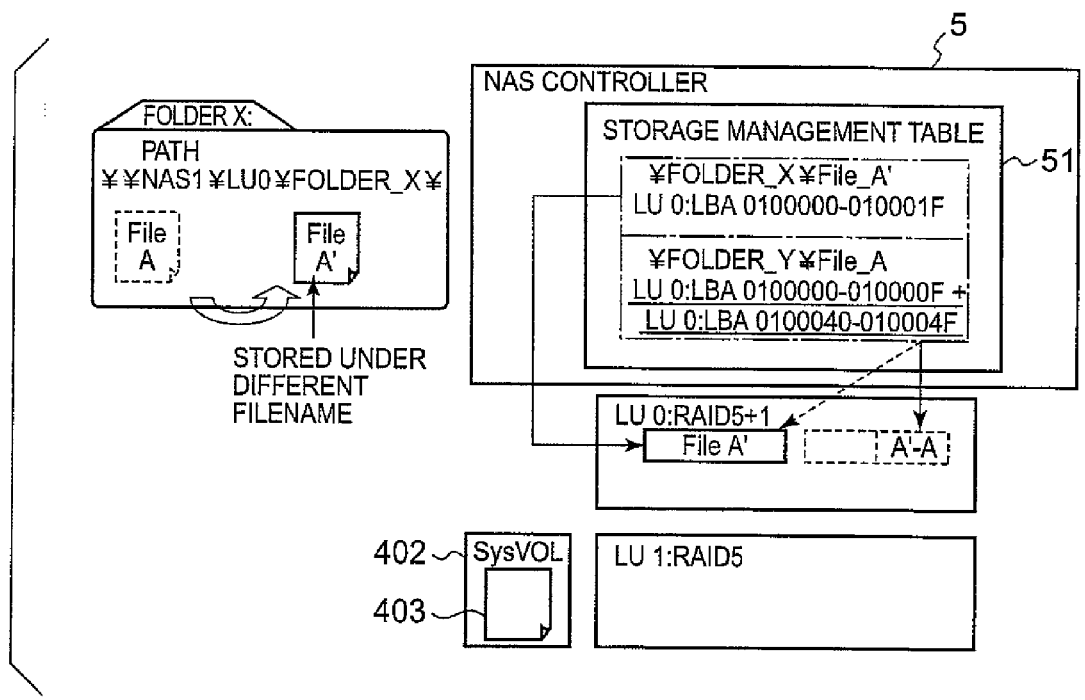
FIG. 6B is a conceptual view of yet another example of releasing an overlap data area.

FIG. 6B is a conceptual view of another example of releasing an overlap data area.

File A resides in LU0. It is supposed that file A is updated afterwards, and that update file A (hereinafter, update file A') is updated using a filename that differs from file A. This results in both old file A and update file A' residing in LU0 (However, the filenames are different.).

In this case, the CPU 11 of the NAS controller 5 can detect via a prescribed method the fact that the update file A' and the old file A, which reside in LU0, partially overlap one another.

The CPU 11 produces a difference file (BNF) A'-A on the basis of the update file A' and the old file A. Then, instead of releasing the storage area in which the old file A resides, the CPU 11 writes the difference file (BNF) A'-A to a LU, which has a released storage area. Pursuant to this processing, the CPU 11 updates the file-metadata related to the old file A (More specifically, for example, updating is the same as that in the case of FIG. 6A.)

Further, the CPU 11 records, in an overlap file list 403 in a system volume 402, a log relating the fact that the storage area in which old file A resided was released from LU0.

The above is an example of releasing an overlap data area.

This embodiment will be explained in more detail hereinbelow.

Firstly, in order to make the releasing of an overlap data area easier to understand, FIG. 7 and FIG. 8 will be referred to for reference purposes, and the processing flows for reading a file and writing a file will be explained in a case in which an overlap data area is not released. Thereafter, a file read process and a file write process carried out in accordance with this embodiment, that is, the flow of file read processing and file write processing when an overlap data area is released, will be explained.

FIG. 7 shows an example of a file read processing flow when an overlap data area is not released.

When a file read command (a file-level read command) is received, the CPU 11 of the NAS controller 5 checks whether or not the file to be read, which is the target of the read command, resides in a cache area in memory 7 (Step S1).

If the result of S1 is that the read-targeted file is in the cache area (S2: YES), the CPU 11 instructs the data controller 14 to transfer the read-targeted file in the cache area to the information processing device 1, which sent the read command (S11). As a result of this, the read-targeted file in the cache area is sent from the data controller 14 via a LAN I/F control portion 13 to the information processing device 1 where the read command originated (S12).

If the result of S1 is that the read-targeted file is not in the cache area (S2: NO), the CPU 11 retrieves the file-metadata of the read-targeted file from the storage management table 51 (S3).

If the result of S3 is that the file-metadata of the read-targeted file cannot be found (S4: YES), the CPU 11 reports abnormal end state to the information processing device 1 from which the read command originated (S5).

If the file-metadata of the read-targeted file is found as a result of S3 (S4: NO), the CPU 11 refers to the reference location information in this file-metadata (In other words, it acquires the storage location of the read-targeted file) (S6). Then, the CPU 11 instructs the data controller 14 to acquire the data of the read-targeted file (S7). As a result of this, a read-targeted file data read command is sent from the data controller 14 to the storage device system 2 via an FC I/F control portion 15 (S8). Based on this, the data of the read-targeted file is read from either LU48 or LU50, and the read data is transferred to the NAS controller 5 from the storage device system 2 (S9). Then, the data controller 14 of the NAS controller 5 stores the data of the read-targeted file in the cache area of memory 7, and the CPU 11 updates a cache table, which is not shown in the figure (For example, a table, which indicates what location of the cache area the data is stored in) (S10). Thereafter, the above-mentioned S11 and S12 processing are carried out.

Figure 8:
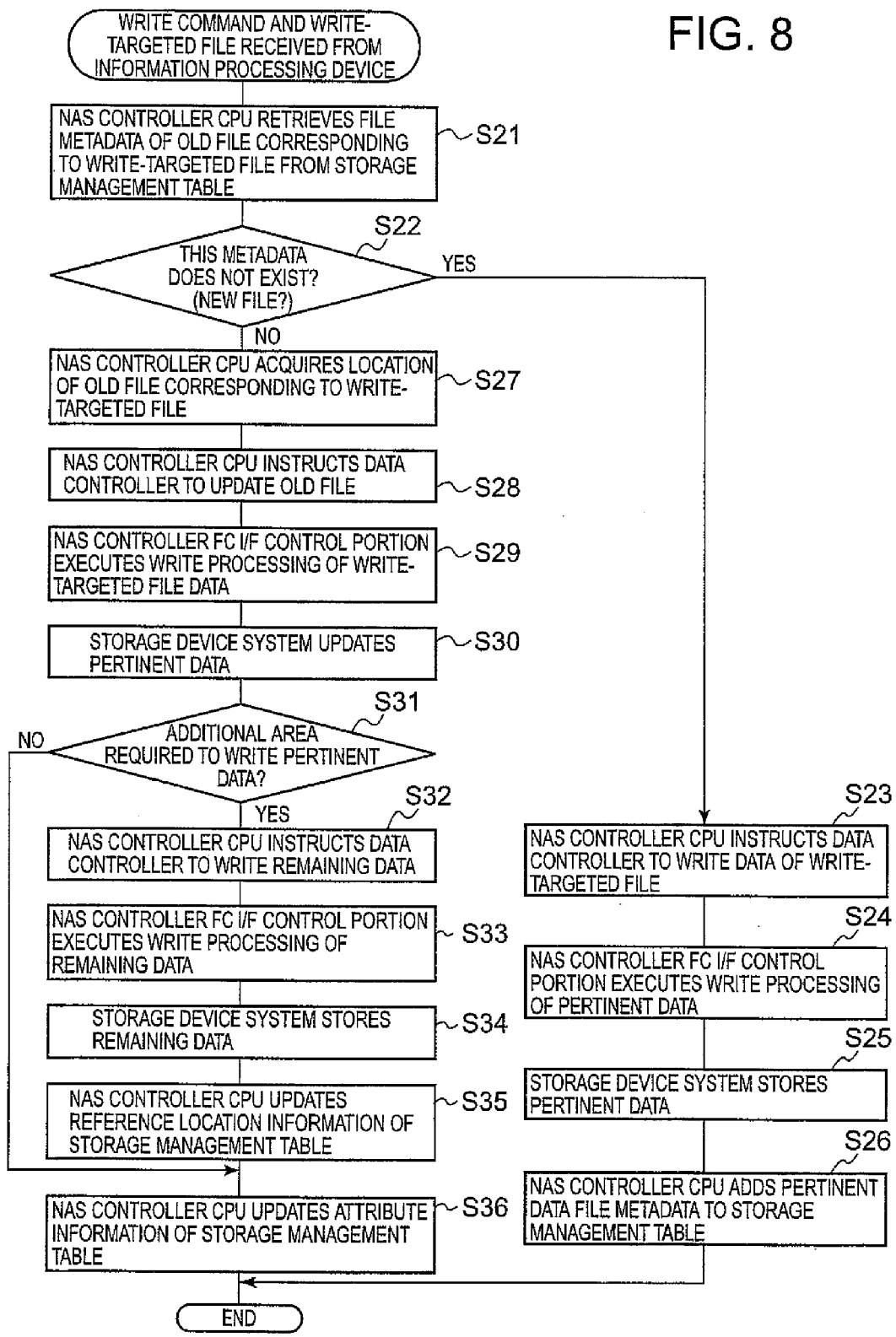
FIG. 8 shows one example of a file write process flow when an overlap data area is not released.

FIG. 8 shows an example of a file write processing flow when an overlap data area is not released.

When a file-write command (a file-level write command) and write-targeted file are received, the CPU 11 of the NAS controller 5 retrieves the file-metadata of an old file corresponding to the write-targeted file from the storage management table 51 (S21).

If the file-metadata of the old file cannot be found in S21 (S22: YES), then the write-targeted file is a new file, which has not been stored in the storage device system 2 yet. The CPU 11 instructs the data controller 14 to write the write-targeted file into a free area of the logical volume specified in the write command (S23). Thus, a write command for writing the data of the write-targeted file is sent from the data controller 14 to the storage device system 2 via the FC I/F control portion 15 (S24). The data of the write-targeted file in either LU 48 or 50 is written to the specified logical volume (S25). The CPU 11 generates the file-metadata of the written write-targeted file, and adds this file-metadata to the storage management table 51 (S26).

When the file-metadata of the old file is found in S21 (S22: NO), the write-targeted file constitutes an update file of an old file that is already being stored in the storage device system 2. The CPU 11 references the reference location information in the file-metadata of the old file (S27). Then, based on this reference location information, the CPU 11 instructs the data controller 14 to update the data of the old file in the update file. (In other words, it overwrites the update file with the old file.)(S28) By so doing, an update file write command is sent from the data controller 14 to the storage device system 2 via the FC I/F control portion 15 (S29). As a result of this, update file data is written to either LU 48 or 50 (S30).

When the data size of the update file is smaller than the data size of the old file (S31: NO), processing proceeds to S35. When the data size of the update file is larger than the data size of the old file (S31: YES), the CPU 11 of the NAS controller 5 instructs the data controller 14 to write the surplus data (referred to here as "remaining data") in a free area of the logical volume to which the update file was written (S32). In accordance with this, a remaining data write command is sent from the data controller 14 to the storage device system 2 via the FC I/F control portion 15 (S33). The remaining data is also written into either LU 48 or 50 (S34). The CPU 11 of the NAS controller 5 updates the file-metadata of the written update file (S35). For example, when the update file and the old file are exactly alike, the CPU 11 updates attribute information such as the update date/time. Also, when the above-mentioned remaining data is stored, for example, the CPU 11 also updates the reference location information in addition to the attribute information. (For example, it adds a link table corresponding to the remaining data.)

The NAS controller 5 CPU 11 can send the storage management table 51 to the storage device system 2, and store it in a storage resource of the storage device system 2 (for example, either HDD 45 or 46, memory 27, cache memory 35 or shared memory 33).

The above is an explanation of the flows of file read processing and file write processing when an overlap data area is not released. Next, the flows of file read processing and file write processing in cases when an overlap data area is released will be explained.

Figure 9:
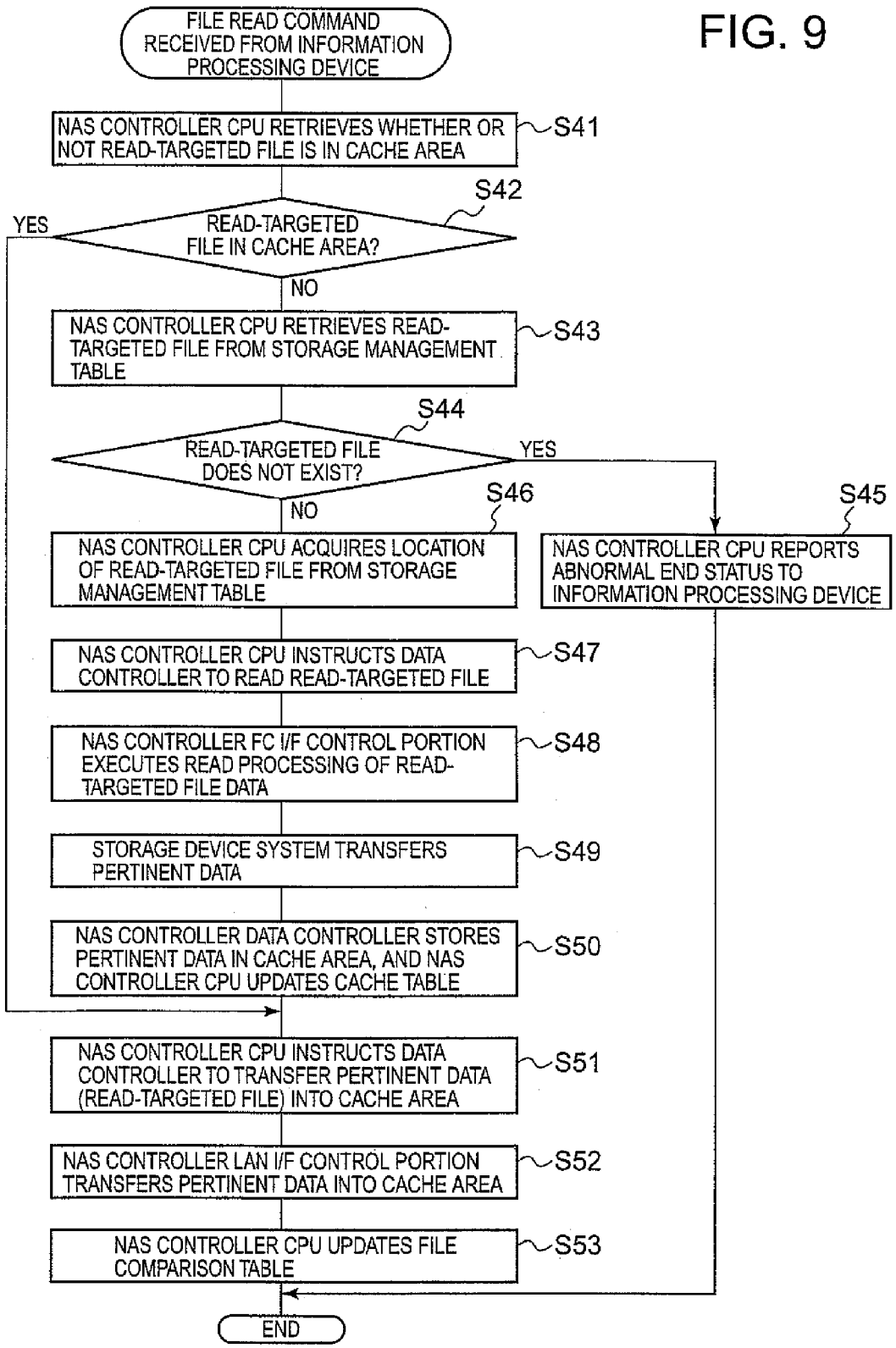
FIG. 9 shows one example of a file read process flow when an overlap data area is released.

FIG. 9 shows an example of a file read processing flow when an overlap data area is released.

S41 through S52 of FIG. 9 are the same as S1 through S12 of FIG. 7. After S52, the NAS controller 5 CPU 11 adds a record comprising a prescribed type of information related to a file, which has been read, to the top of a file comparison table 53 (S53).

Figure 10:
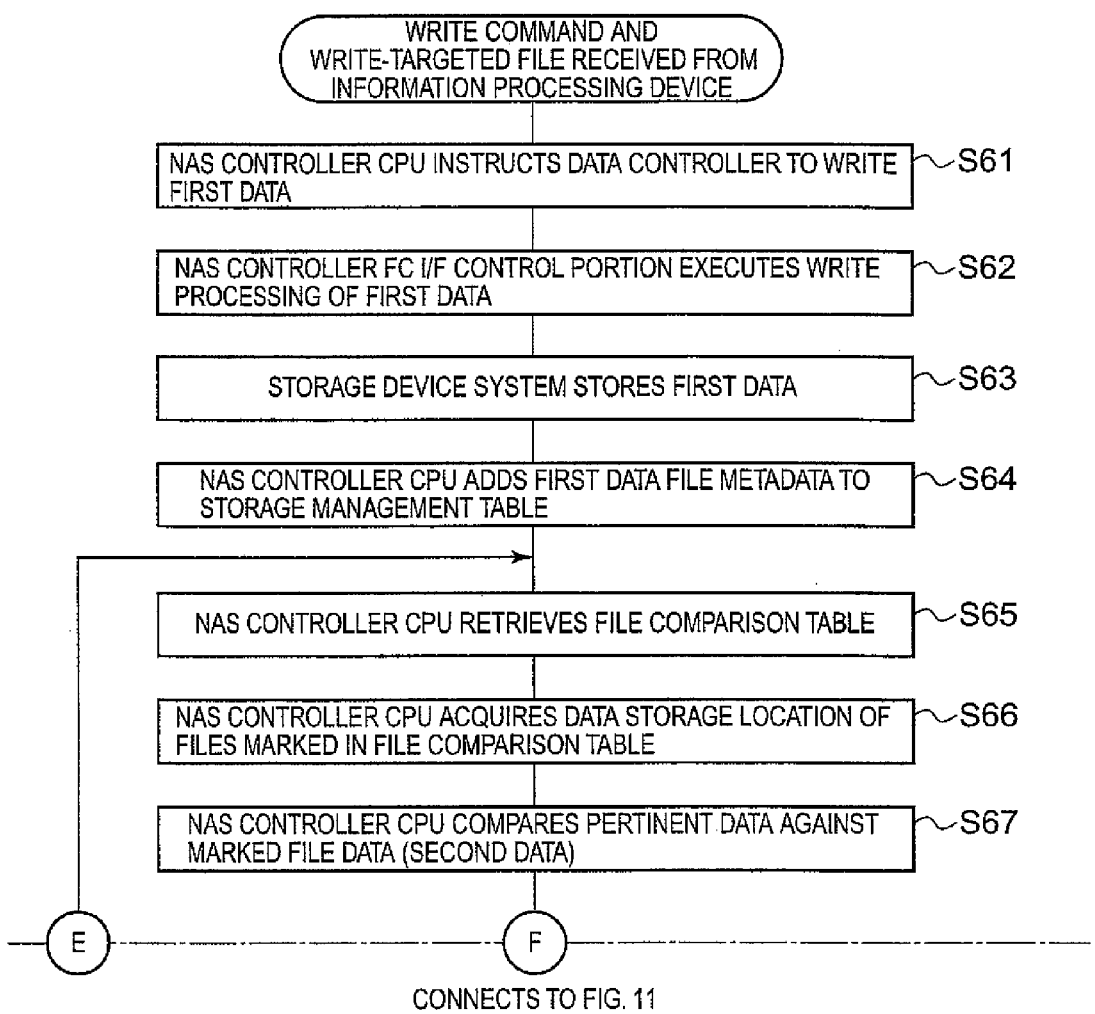
FIG. 10 shows a portion of an example of a file write process flow when an overlap data area is released.
Figure 11:
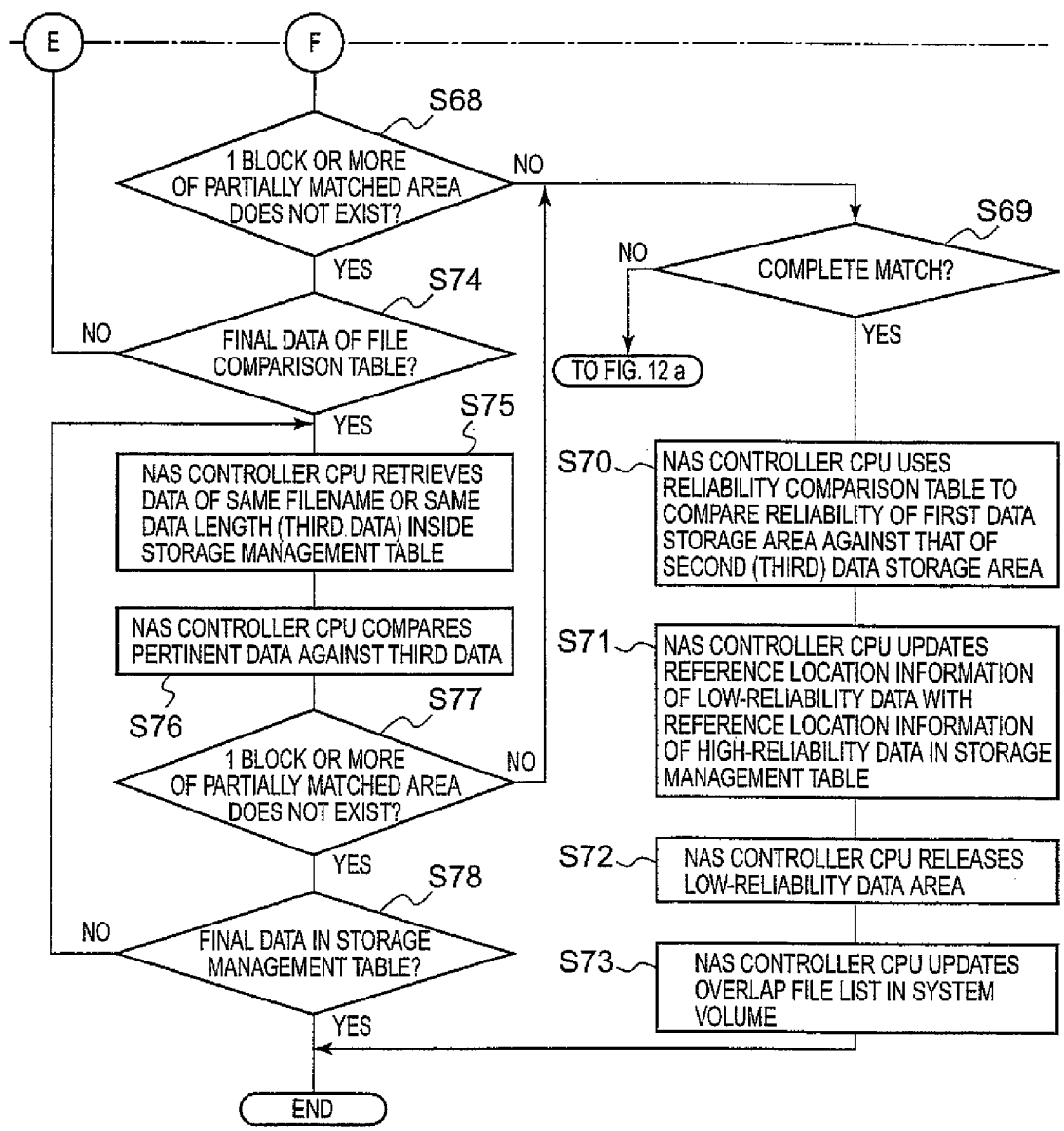
FIG. 11 shows another portion of an example of a file write process flow when an overlap data area is released.
Figure 12:
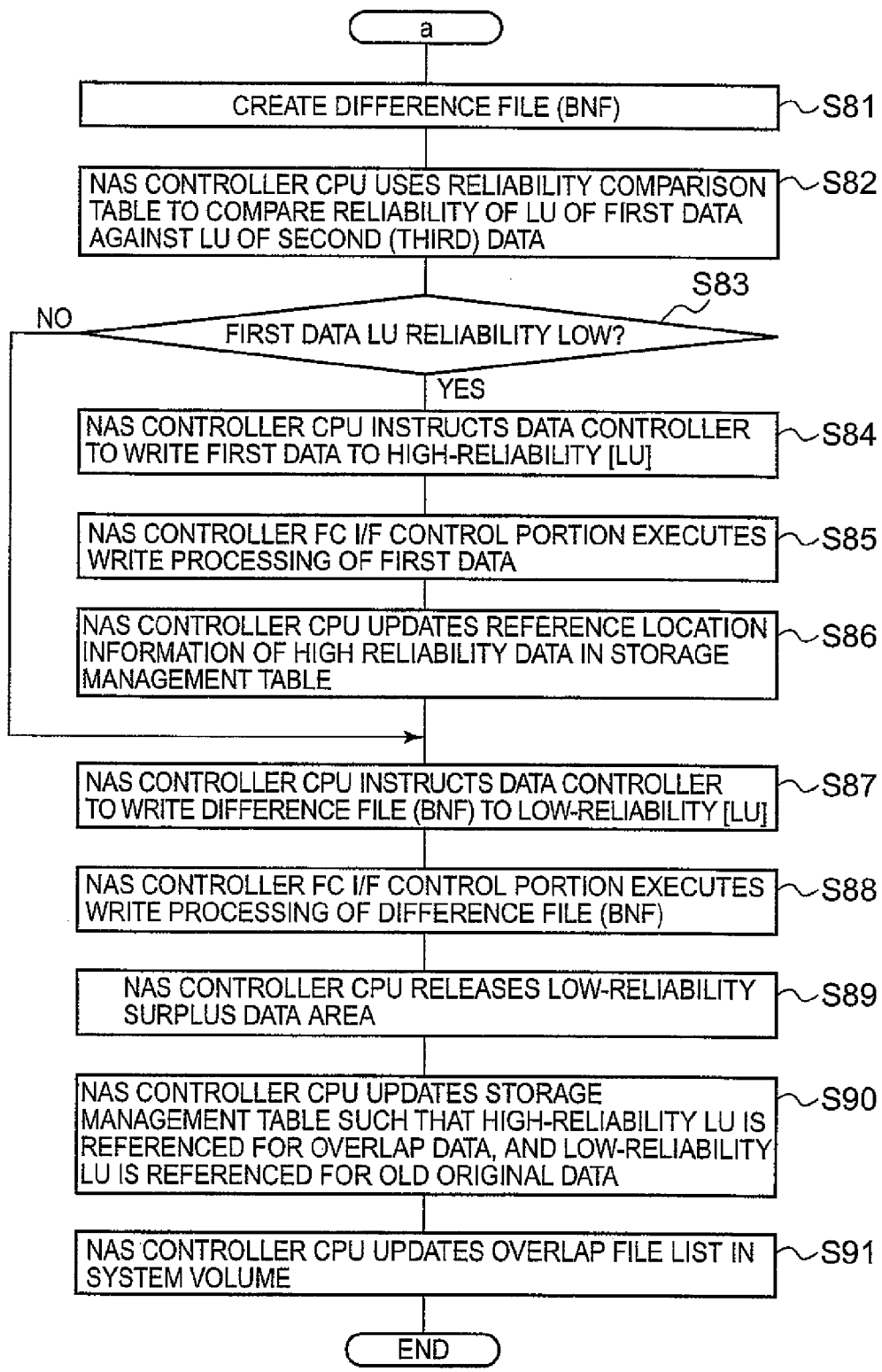
FIG. 12 shows yet another portion of an example of a file write process flow when an overlap data area is released.

FIGS. 10, 11 and 12 show an example of a file write flow when an overlap data area is released. For the sake of convenience, the write process will be explained hereinbelow by referring to FIG. 4 in addition to these figures. Furthermore, the processing flow shown by FIG. 10, FIG. 11 and FIG. 12 is the flow for writing a so-called new file when the file-metadata of an old file, which is the write-targeted file, does not exist in the storage management table 51. However, this process is not only for when a write-targeted file is a new file, but can also be applied in the case of a update file.

When a determination has been made that a write-targeted file is a new file, as shown in FIG. 10, the same processing as in S23 through S26 of FIG. 8 is carried out (S61 through S64). Hereinbelow, the data of the new file will be called "first data". Furthermore, in the case of remote copying, which will be explained hereinbelow, the CPU 11 can save first data to either the cache area of the NAS controller 5 or the cache memory 35 of the storage device system 2, and then transfer this first data from either the cache area or cache memory 35 to the copy destination.

The NAS controller 5 CPU 11 references the record at the head of the file comparison table 53 (S65), and acquires the reference location information of files that have been marked in this file comparison table 53 from the storage management table 51 (S66). Here a "marked file" is a file corresponding to a record, which exists in the file comparison table 53. As shown in FIG. 4, the CPU 11 compares the data of the marked file, which resides in the location denoted by the reference location information acquired in S66 (hereinafter referred to as "second data"), against the first data (S67).

When the result of S67 is that there is no partial matching area (in other words, overlap data) of one block (for example, 512 bytes) or more, if the record referenced in S65 was not the last record in the file comparison table 53 (S74: NO), processing returns once again to S65. When the record referenced in S65 was the last record in the file comparison table 53 (S74: YES), the CPU 11 retrieves the file metadata of a file with a filename and/or a data length that is the same as the first data (hereinafter, the data of this file will be called the "third data") from the storage management table 51 (S75). When the file-metadata of the third data is not found, processing can be terminated. When the file-metadata of the third data is found, the CPU 11 compares the first data against the third data residing in a location denoted by the reference location information in this file-metadata (S76).

When S76 results in a partial matching area of one block or longer (S77: NO), and all the data matches (S69: YES), S70 processing, which will be explained hereinbelow, is carried out, and when there is partial matching (S69: NO), S81 processing of FIG. 12 is carried out. When S76 does not result in a partial matching area of one block or longer (S77: YES), S75 processing is performed once again, provided the file-metadata found via the S75 retrieval is not file-metadata residing in the final location of the storage management table 51 (S78: NO).

Now then, when either S67 or S76 results in a partial matching area of one block or longer (Either S68 or S77 of FIG. 11: NO), and all the data matches (S69: YES), S70 processing, which will be explained below, is carried out.

That is, as shown in FIG. 4 as well, the CPU 11 references the reliability comparison table 55, and compares the reliability ranking of the LU of the second data (or the third data) against the reliability ranking of the LU of the first data (S70). The CPU 11 updates the reference location information of the data with a low reliability ranking with the reference location information of the data with a high reliability ranking (S71). The CPU 11 releases the storage area of the data with a low reliability ranking (S72). The CPU 11 registers information related to the first data and the second data (or the third data), which are complete overlaps (for example, all or part of the respective file-metadata), and the fact that the area in which either one of these first data and second data (or third data) resided has been released in the overlap file list 403 in the system volume 402 (S73).

When either S67 or S76 results in a partial matching area of one block or longer (Either S68 or S77 of FIG. 11: NO), but not all the data matches (S69: NO), S81 processing of FIG. 12 is carried out. That is, the CPU 11 produces a difference file (BNF) based on the first data (update file) and either the second data or the third data (old file) (S81). The CPU 11 references the reliability comparison table 55, and compares the reliability ranking of the LU of the first data (hereinafter, the first LU) and the reliability ranking of the LU of the second data (or the third data) (hereinafter, the second LU) (S82).

When the reliability ranking of the first LU is higher than that of the second LU in S82 (S83: NO), processing S87 which will be explained hereinbelow is carried out.

On the other hand, when the reliability ranking of the first LU is lower than that of the second LU in S82 (S83: YES), the CPU 11 issues instructions to the data controller 14 to write the first data to the second LU (S84). Thus, the first data is written to the second LU, which has a higher reliability ranking (S85). The CPU 11 updates the reference location information of the first data with information denoting the location of the write destination in the second LU (S86).

The CPU 11 issues instructions to the data controller 14 to write the difference file (BNF) to an LU with a low reliability ranking (S87). Accordingly, the difference file (BNF) is written from the data controller 14 via the FC I/F control portion 15 to an LU with a low reliability ranking (S88). The CPU 11 clears the area in which at least either the second data or the third data (in addition, for example, the first data residing in an LU with a low reliability ranking) resides (S89).

The CPU 11 updates the second storage management table 51 (S90). More specifically, for overlap data of the first data and second data (or third data), the CPU 11 updates reference location information indicating the area in which this overlap data resides in an LU with a high reliability ranking, and for the old original data in the difference file (BNF), it updates reference location information indicating the area in which this old original data resides in an LU with a low reliability ranking (or an LU with the same reliability ranking).

The CPU 11 updates the overlap file list 403 of the system volume 402 (S91). More specifically, the CPU 11 records in the overlap file list 403 that fact that the first data and the second data (or the third data) overlap one another (It can also record the fact that the second data area has been cleared, and the difference file (BNF) written to an LU with a low reliability ranking.)

The above is an example of a write processing flow.

The yet to be explained system volume 402 and overlap file list 403 will be explained hereinbelow.

The system volume 402, for example, is a logical volume, which cannot be accessed from the information processing device 1 (a logical volume to which at least a write operation from the information processing device 1 is prohibited). System information related to the control of the storage device system 2 is stored in the system volume 402, and the CPU 25 of the storage device system 2 can read in this system information from the system volume 402, and carry out operations based on this system information. The overlap file list 403 is what is called a log file. Files that completely or partially overlap other files, and which files overlap which other files, is recorded in the overlap file list 403 (The entire or partial areas of the data of those overlap files that have been released can also be recorded.) More specifically, for example, information such as (1) [Source] Path¥Filename (File Handle; Metadata Location, etc.)
(2) [Copy] Path¥Filename (File Handle) Copy Date/Time (Complete Overlap or Partial Overlap)

can also be recorded in the overlap file list 403. Here, the [Source] of (1) can be thought of as the overlap data, which has been left, rather than the overlap data storage area, which has been released, regardless of whether it is an old file or an update file. In relation to this, the [Copy} of (2), by contrast, can be thought of as the released area among those mutually duplicating files for which an overlap data storage area has been released, and not the overlap data that has been left.

Figure 13A:
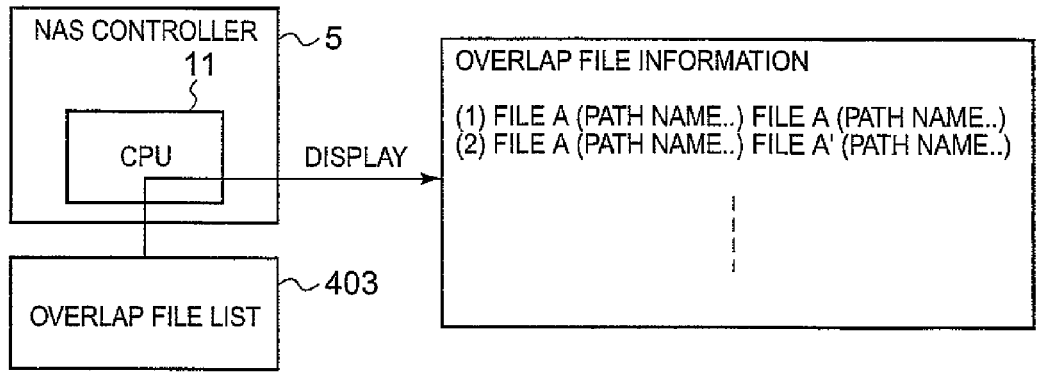
FIG. 13A shows an example of a display based on an overlap file list.
Figure 13B:
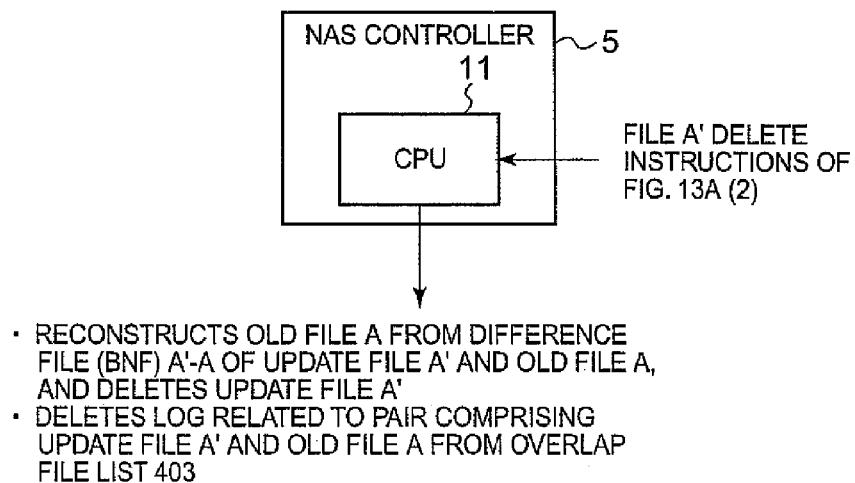
FIG. 13B shows an example of the deletion of an update file based on an overlap file list.

As shown in FIG. 13A, the NAS controller 5 CPU 11, for example, can, based on this overlap file list 403, display those files that overlap one another on a specified device (For example, either the information processing device 1 or a not-shown terminal utilized by a systems administrator (hereinafter, administrator's terminal)). Also, for example, when instructions to delete a certain overlap file are received from the above-mentioned specified device (hereinafter, "specified device"), the CPU 11 can delete this overlap file by deleting this overlap file and its file-metadata. More specifically, for example, when the overlap file for which delete instructions were issued is an old file, the CPU 11 can delete this old file by deleting the left difference file (BNF) and the file-metadata of the old file. Also, for example, when the overlap file for which delete instructions were issued is an update file, the CPU 11, as shown in FIG. 13B, can delete this update file A' by reconstructing old file A using the left difference file (BNF) A'-A and update file A', and deleting update file A' and its file-metadata. Further, once an overlap file has been deleted, the CPU 11 can also delete information related to this overlap file from the overlap file list 403. For example, using the example of FIG. 13B, when update file A' is deleted, the CPUI 11 can delete information related to the pair of files constituted by this update file A' and the old file A.

Figure 13C:
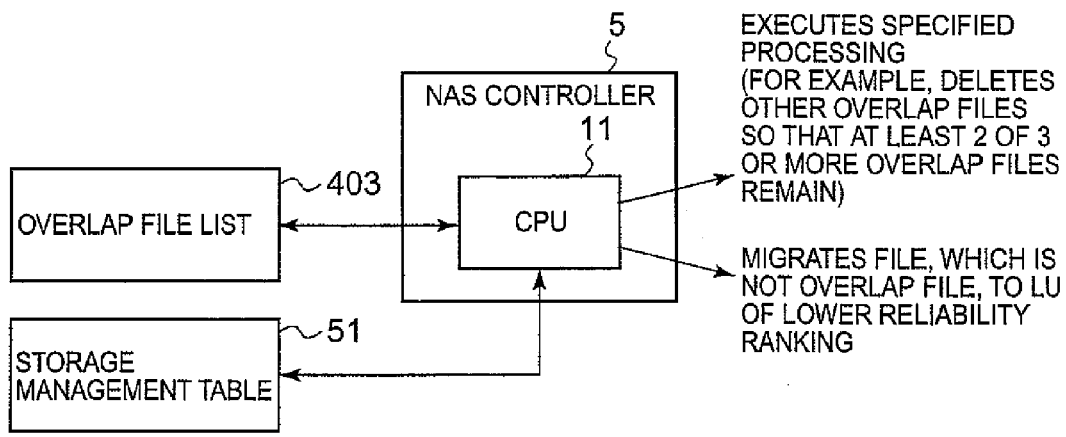
FIG. 13C shows an example of processing when specifying an overlap file based on an overlap file list.

Further, the NAS controller 5 CPU 11, for example, can specify just which files overlap which other files by referencing the overlap file list 403 as shown in FIG. 13C. The CPU 11 can execute specification processing based on the results of specification. For example, when the CPU 11 specifies two or more files, which either completely or partially overlap a certain file, in other words, when it specifies three or more files that overlap one another, it can delete files with the exception of at least two files. Further, the CPU 11 can leave a file that resides in an LU with a high reliability ranking at this time, and it can migrate the left file to an LU with a higher (or the highest) reliability ranking.

Also, the NAS controller 5 CPU 11 can also specify which, of a plurality of files residing in storage device system 2, do not overlap other files by also referencing, for example, the storage management table 51 in addition to the overlap file list 403. In this case, as shown in FIG. 13C, for example, the CPU 11 can migrate a file that is not overlapped from the first LU, where this file is currently residing, to the second LU, which has a low reliability ranking, and release the area of the non-overlap file from the first LU, thereby increasing the free storage capacity of the first LU.

According to this first embodiment described hereinabove, of two files that overlap one another, the file that is in a location with a high reliability ranking will be left, and the area of the file that is in a location with a low reliability ranking will be released. When an old file and a post-update file partially overlap one another, and the post-update file is in a location with a low reliability ranking, the old file is released after being migrated to a location with a high reliability ranking. Such processing makes it possible to reduce the storage capacity being used, while lowering the risk that a file will be lost.

Also, according to this first embodiment, the scope of overlap file retrieval carried out at file write is not all files residing in the storage device system 2, but rather, is narrowed to one or more files read out near the point in time of this write (For example, either files, which were read within a prescribed time period from the time of the write, or a prescribed number of files, which were read near the time of the write). This is efficient from the following standpoint. That is, for example, when a file is to be copied from one folder to another folder in accordance with a command from an information processing device 1, an old file is read from the one folder and written to either the same or a different folder as an update file. At this time, the write processing of either a certain file or an update file relative thereto is carried out in a relatively short period of time (for example, within 24 hours) following the read processing for the certain file. Therefore, as explained hereinabove, setting the scope of overlap file retrieval to one or more files read near the point in time of the file write is considered efficient from the standpoint of detecting overlap files. At least it is possible to find overlap files in a shorter period of time than it takes to retrieve overlap files using the brute force method.

Also, in accordance with this first embodiment, the difference file generated when an old file and an update file partially overlap one another is not a difference file (BOF), but rather a difference file (BNF). This is considered more efficient than generating and saving a difference file (BOF) rather than a difference file (BNF). This is because, when it comes to which of the old file and update file will be deleted, it is felt there is a greater likelihood of the old file being deleted than the update file. More specifically, for example, this is because, when an old file is deleted, if there is a system for saving a difference file (BNF), deletion can be carried out by simply deleting the file-metadata corresponding to the old file and the difference file (BNF), but if the system leaves a difference file (BOF), then it is necessary to reconstruct an update file using the difference file (BOF) and the to-be-deleted old file.

Further, in accordance with this first embodiment, when an overlap file is detected, information related to the files, which overlap one another, is recorded in an overlap file list 403. If a system administrator or user should request to be informed of the overlap files residing in the storage device system 2, since the presentation of this information can be carried out based on the overlap file list 403, the requested information can be presented in a shorter period of time than it would take to carry out retrieval once again.

In this first embodiment, when an overlap file is detected, information related to the detected overlap file is recorded in the overlap file list 403 at a prescribed timing (for example, when the storage area of at least one of the overlap data is released). By so doing, thereafter it is possible to specify the overlap file from the information recorded in the overlap file list 403. More specifically, for example, the CPU 11 can provide the information recorded in this overlap file list 403 to the above-mentioned specification device (for example, either the information processing device 1 or the administrator's terminal), and if this information is displayed, the operator of the specification device (for example, a user or administrator) can easily specify the overlap file. Or, for example, the CPU 11 can rapidly specify which files are overlap files by referencing the overlap file list 403.

In other words, in this first embodiment, after an overlap file has been detected, information as to which files are overlaps is not recorded in the storage management table 51, but rather is recorded in an overlap file list 403 prepared separately from the storage management table 51.

For example, when three or four copies of a file have been prepared, it is possible that one copy is a copy of another copy. Creating an area in the storage management table 51 for accurately detecting just which copies are copies of other copies is not viewed as efficient. Further, in addition to the retrieval operation carried out when one file is copied, it is also necessary to retrieve the overlap of the file of this copied file. In this case, if the overlap file list 403 listed up all the overlap files in the storage device system 2, it would be possible to specify an overlap file by retrieving the contents of the list 403, thereby enabling a smaller scope of retrieval than a method that utilizes the storage management table 51. As a concrete example of this, after creating file B, which is the update file of file A, file C, which is the update file of file B, is created, and when update file C is migrated to the LU where file B resides, referencing the overlap file list 403 makes it possible to rapidly specify file A as the file that overlaps file B, as well as the location of the file-metadata of file A.

Furthermore, in this first embodiment, with regard to the information related to overlap files recorded in the overlap file list 403, for example, even if one file has multiple overlap files, recording the information related to the overlap files on a one-to-one basis is considered preferable to recording it on a one-to-N basis. More specifically, for example, when one file A has two overlap files B, C, it is considered preferable to record them separately as file A and file B, and file A and file C. By so doing, for example, when file A of file A and file B is deleted, the file-metadata related to file B is updated, doing away with the need to update metadata related to file C.

Embodiment 2

A second embodiment of the present invention will be explained hereinbelow. Furthermore, mainly the points of difference with the first embodiment explained above will be explained below, and explanations of points shared in common with the first embodiment will either be omitted or simplified (The same will also hold true for the other embodiments explained hereinbelow.)

Figure 14:
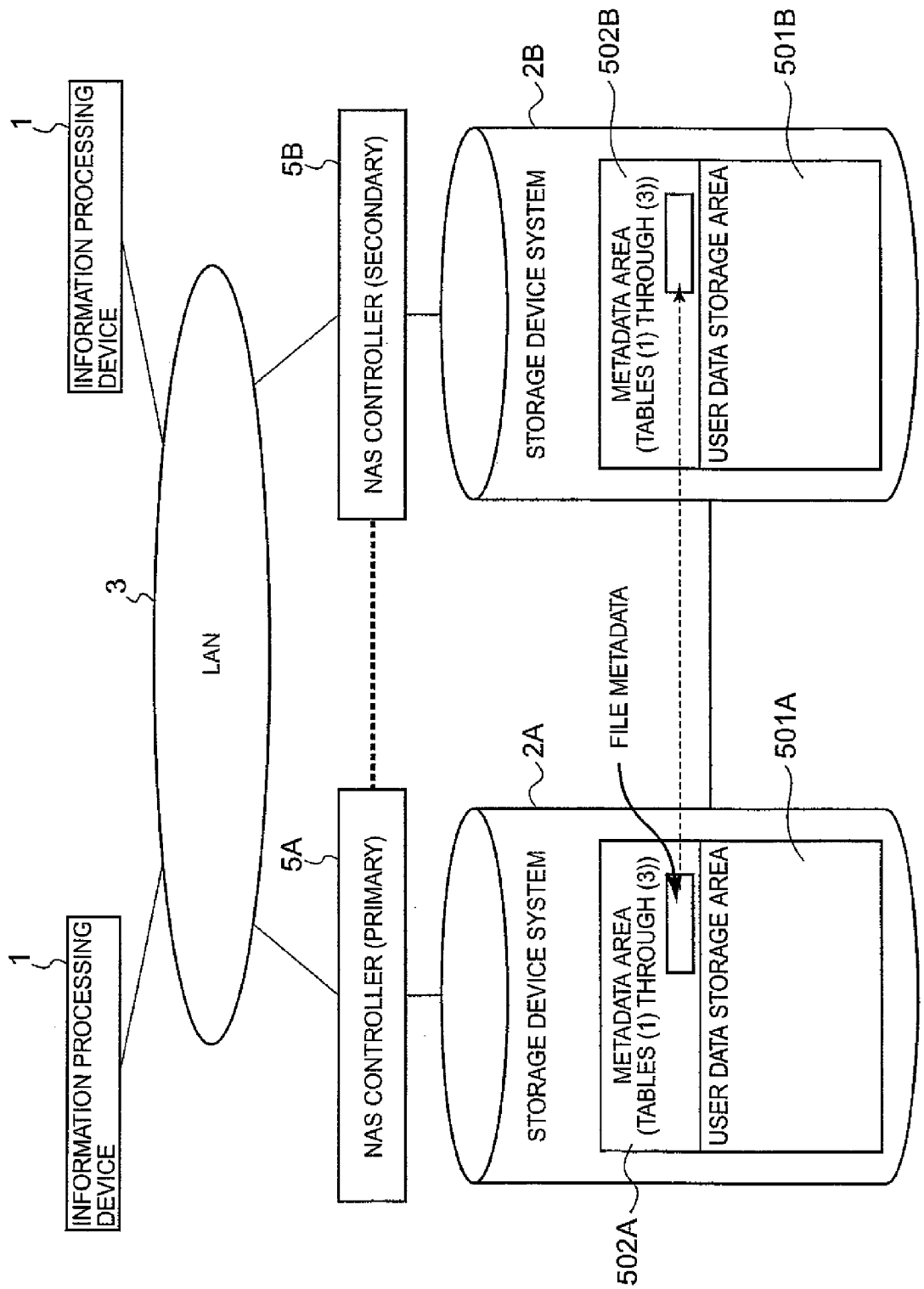
FIG. 14 shows an overview of an information processing system related to a second embodiment of the present invention.

FIG. 14 shows an overview of an information processing system related to a second embodiment of the present invention.

This information processing system is a system for enabling what is called remote copying. For example, there are a primary NAS controller 5A and a secondary NAS controller 5B. A primary storage device system 2A is connected to the primary NAS controller 5A, and a secondary storage device system 2B is connected to the secondary NAS controller 5B. The secondary storage device system 2B (for example, its base chassis) is connected via a leased line or communications network to the primary storage device system 2A (for example, its base chassis) to enable communications (solid lines in the figure).

An example of an overview of the processing carried out by this information processing system is as follows.

For example, first, all the data residing in a user data area (for example, an area on an HDD storage resource other than a system volume) 501A in the primary storage device system 2A is copied to an HDD storage resource on the secondary storage device system 2B, thereby providing the same area 501B as the user data area 501A of the primary storage device system 2A in the secondary storage device system 2B.

Further, the above-mentioned various tables 51, 53, and 55 are recorded in a prescribed metadata area (for example, shared memory 33) 502A in the primary storage device system 2A. These tables 51, 53 and 55 are also transferred to the secondary storage device system 2B, thereby providing the same area 502B as the metadata area 502A of the primary storage device system 2A in the secondary storage device system 2B.

Next, for example, when a file, which is a complete overlap of a certain file residing in the user data area 501A, is stored in this area 501A, either the NAS controller 5 or the disk controller 23 (for example, either CPU 11 or 25) records the file-metadata of the newly stored overlap file in the storage management table 51. In this case, the primary storage device system 2A (for example, the disk controller 23) transfers the new overlap file-metadata to the secondary storage device system 2B. The transferred file-metadata is added to the storage management table in the secondary storage device system 2B. Thus, the data of the new overlap file itself is not actually stored in the secondary storage device system 2B, but it makes it possible for the information processing device 1 to recognize the new overlap file as residing in the secondary storage device system 2. More specifically, for example, the secondary NAS controller 5B can make the information processing device 1 recognize the new overlap file based on the file-metadata newly recorded in the storage management table in the secondary storage device system 2B.

Thus, when a second file, which completely overlaps a first file, which is already stored in the user data area 501A, is written to the same area 501A, if the storage area of the second file has been released, the data transferred for remote copying can be limited to the file-metadata of the second file. That is, since there is no need to transfer the written file itself, it is possible to reduce the amount of data to be transferred.

However, it is not considered desirable to simply convert this remote copying system to the remote copying carried out when a partially overlapped update file is written to the user data area 501A under an another filename. This is because, when a simple conversion is carried out, the file-metadata of the update file, the difference file (BNF) and its file-metadata must also be transferred in addition to the update file itself, thereby increasing the amount of data to be transferred.

Accordingly, in order to avoid this problem, as shown in FIG. 14, either instead of or in addition to the storage device systems 2A, 2B being interconnected to enable communications, it is possible to adopt a system in which the NAS controllers 5A, 5B are interconnected to enable communications (hereinafter, the NAS controller interconnection system) (the dotted line in the figure). An example of the flow of processing carried out by the primary and secondary sides in this NAS controller interconnection system will be explained hereinbelow.

Figure 15:
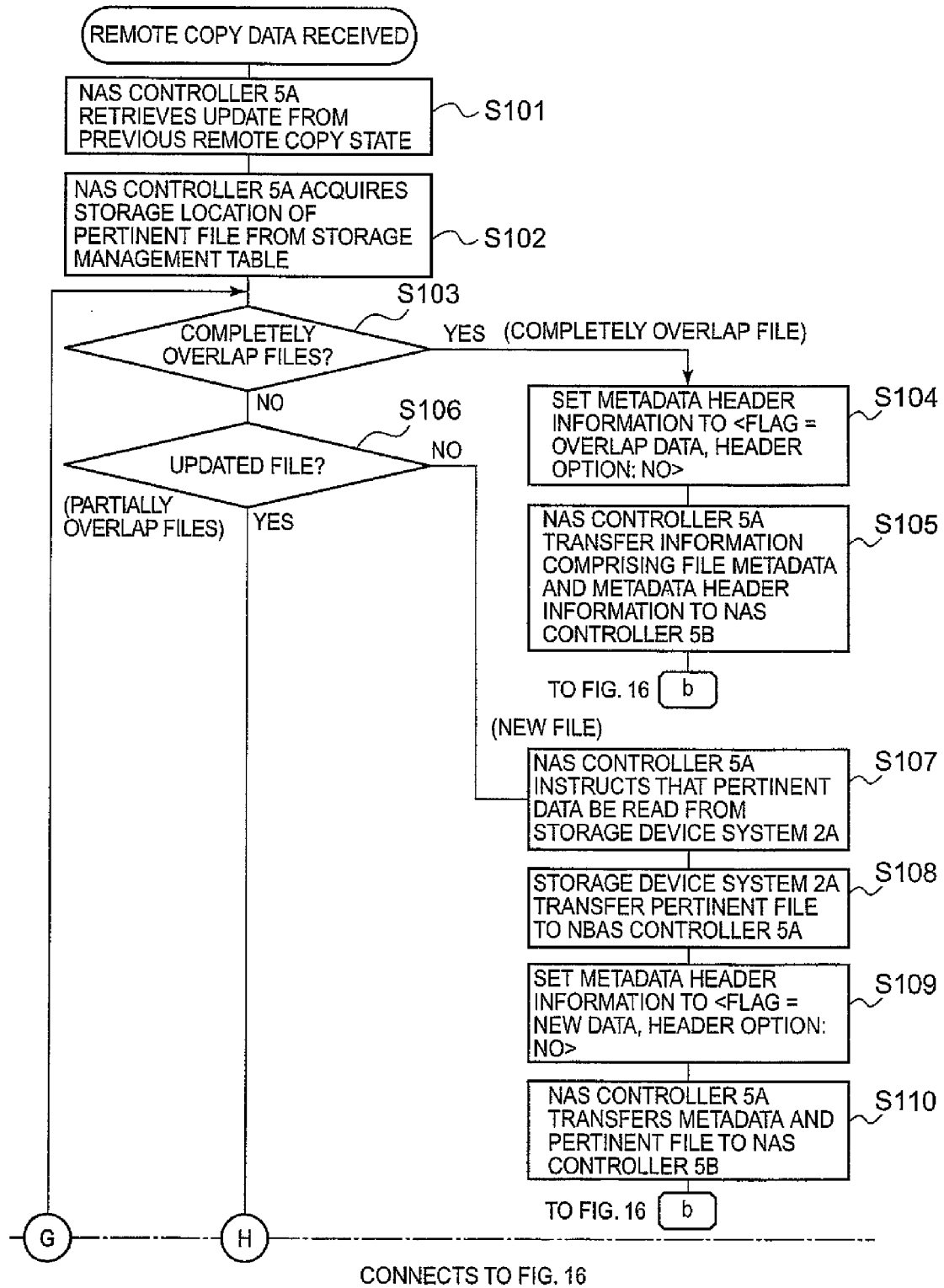
FIG. 15 shows a portion of an example of a processing flow, which is carried out when remote copying commences on the primary side in a NAS controller interconnection system related to the second embodiment of the present invention.
Figure 16:
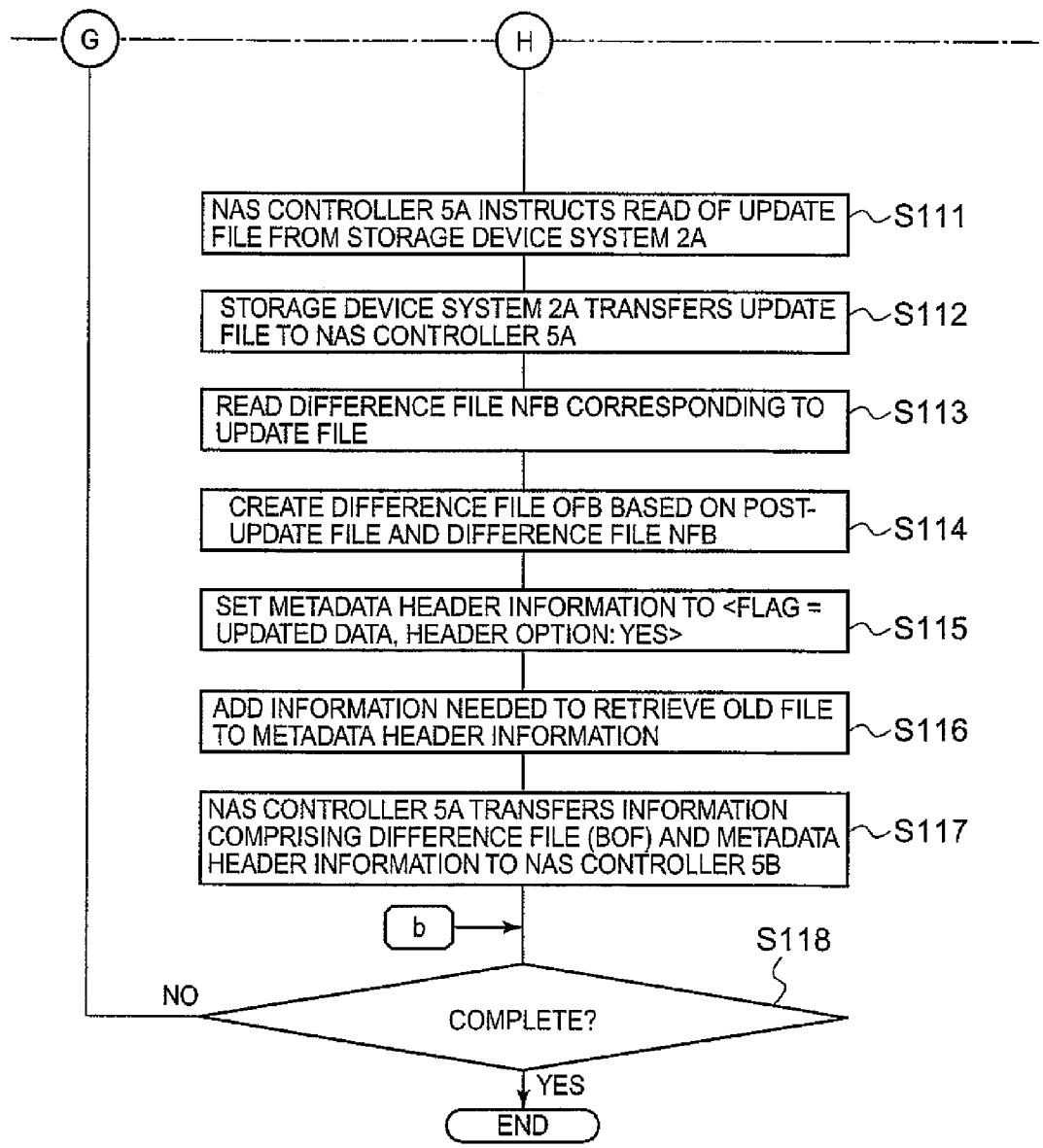
FIG. 16 shows the remaining portion of an example of a processing flow, which is carried out when remote copying commences on the primary side in a NAS controller interconnection system related to the second embodiment of the present invention.

FIG. 15 and FIG. 16 show an example of the processing flow carried out when remote copying is commenced on the primary side in a NAS controller interconnection system.

The NAS controller 5A retrieves an update carried out subsequent to the last remote copy (S101). Thus, for example, the NAS controller 5A can store the date and time of a remote copy processing termination in memory, and can retrieve an update carried out subsequent to the last remote copy by comparing this date and time against the update date and time in the file-metadata of the storage management table 51.

The NAS controller 5A acquires reference location information denoting the location of an update carried out subsequent to the last remote copy, from the storage management table 51 (S102).

When the result of S102 is that the data residing in the acquired reference location information-denoted location is data of a completely overlapped file (S103: YES), the NAS controller 5A sets the flag inside the metadata header information to "Overlap Data", and sets the header option to "No" (S104). Here, metadata header information is the information set in the header of the information comprising the file-metadata sent from the NAS controller 5A. The NAS controller 5A transfers the file-metadata of an overlap file written afterwards and the information comprising the above-mentioned metadata header information to the NAS controller 5B (S105). Thereafter, S118 of FIG. 16, which will be explained below, is carried out.

When the result of S102 is that the data residing in the acquired reference location information-denoted location is a new file (S103: N0, S106: NO), the NAS controller 5A acquires this new file by sending a read command for this new file to the storage device system 2A (S107), and storing it in a cache area (S108). Further, the NAS controller 5A sets the flag in the metadata header information to "New Data", and sets the header option to "No" (S109). The NAS controller 5A sends the new file stored in the cache area, the file-metadata of this new file, and the information comprising the metadata header information in S109 to the NAS controller 5B (S110). Furthermore, when either all or a part of a file, which was received for a write operation subsequent to the last remote copy, was saved in the cache area, and the new file is still saved in the cache area, the NAS controller 5A can send the new file to the NAS controller 5B without carrying out the processing of S107 and S108.

When the result of S102 is that the data residing in the acquired reference location information-denoted location is a partially overlapped update file (S103: N0, S106: YES), the NAS controller 5A acquires this update file by sending a read command for this update file to the storage device system 2A (S111), and storing it in the cache area (S112).

The NAS controller 5A also specifies a difference file (BNF) corresponding to the acquired update file by referencing the storage management table 51, acquires the specified difference file (BNF) from the storage device system 2A, and stores the acquired difference file (BNF) in the cache area (S113). Further, the NAS controller 5A reconstructs an old file from the update file and difference file (BNF) in the cache area, generates a difference file (BOF) based on the old file and update file, and stores the generated difference file (BOF) in the cache area (S114). The NAS controller 5A sets the flag inside the metadata header information to "Updated Data", and sets the header option to "Yes" (S115).

The NAS controller 5A also adds to the header option the information required for the NAS controller 5B to retrieve the same old file as the reconstructed old file from the storage device system 2B (S116). The reference location information of the old file on the secondary side, for example, can be used as the "Required Information". For example, the NAS controller 5A can specify this reference location information by associating the reference location information of this old file to either the file-metadata of the update file or the file-metadata of the difference file (BNF) when the old file area is released from the storage device system 2A. The NAS controller 5A sends information comprising the difference file (BOF) generated in S114 and the metadata header information from S115 and S116 to the NAS controller 5B.

Furthermore, the above-mentioned header option is information that ordinarily does not have to be in the header, and when it does exist in the header, is there for executing a specification function. For example, when retrieval path/filename/area information and the like is included in a header and transferred as the header option, the side receiving the information comprising this header option can retrieve a file based on this header option.

When the above processing has been carried out for all files updated after the last remote copy was performed (S118: YES), processing is terminated, and when it has not (S118: NO), the determination of S103 of FIG. 15 is made for the next unprocessed file.

Figure 17:
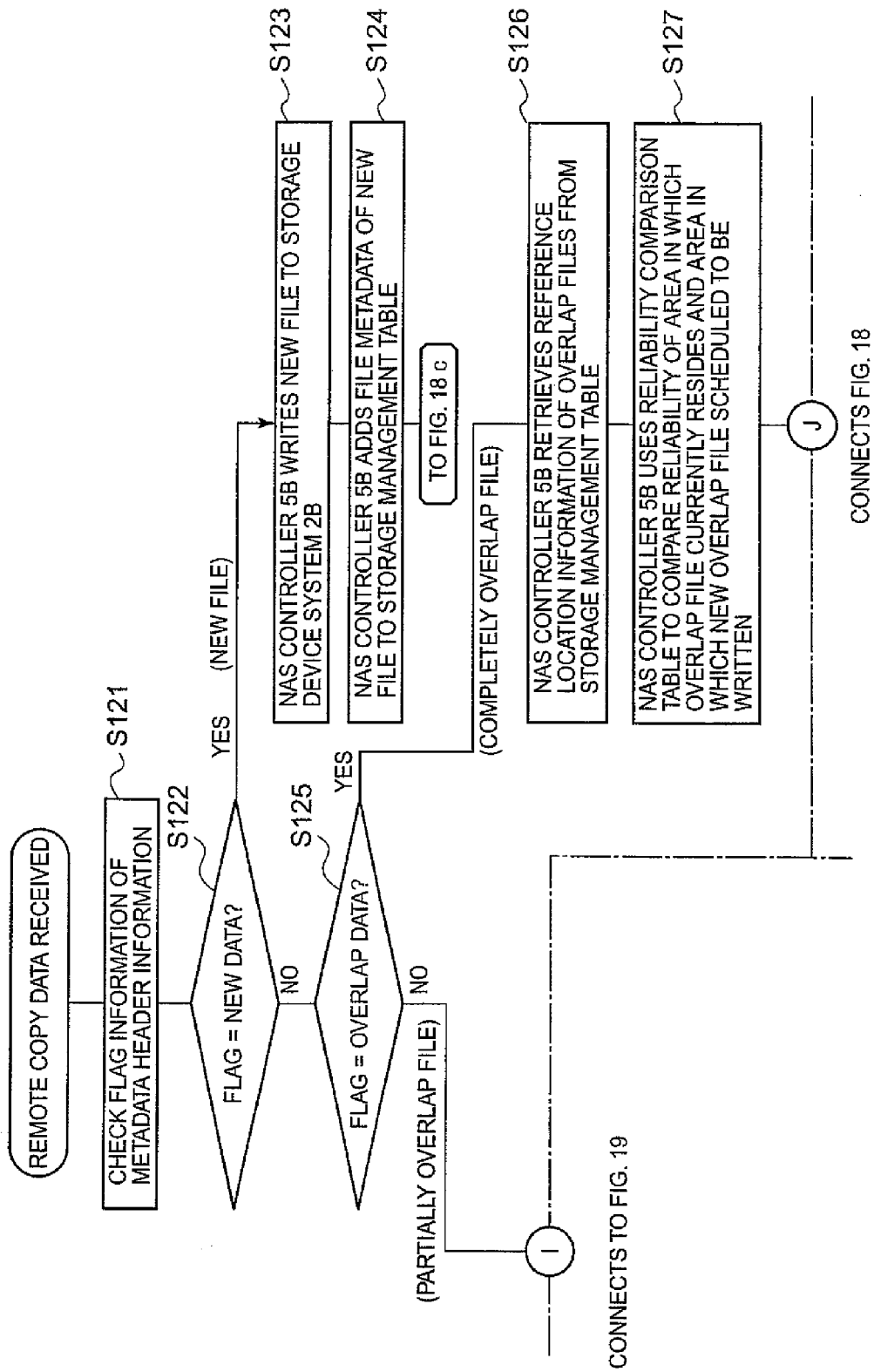
FIG. 17 shows a portion of an example of a processing flow, which is carried out on the secondary side in a NAS controller interconnection system related to the second embodiment of the present invention.
Figure 18:
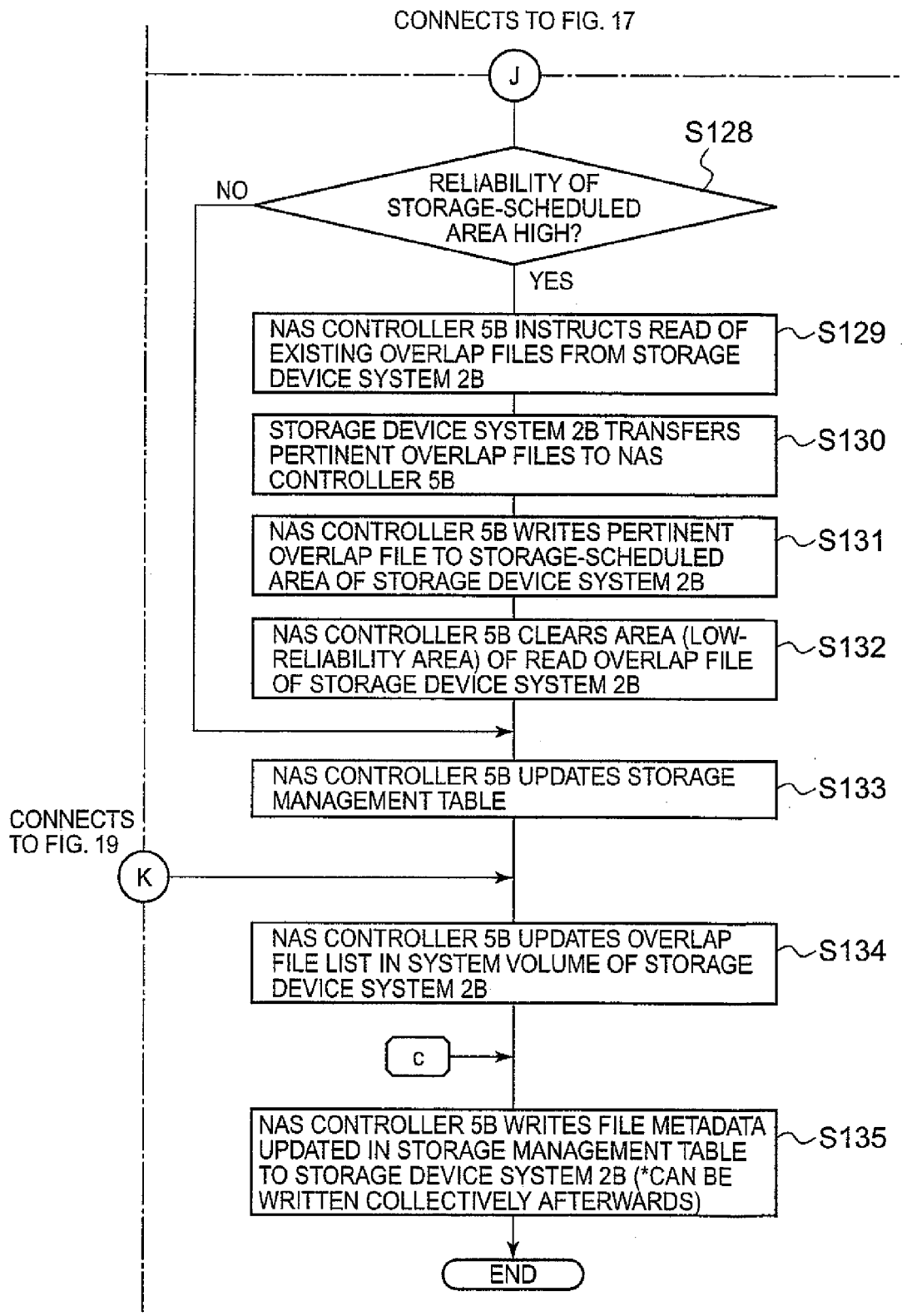
FIG. 18 shows another portion of an example of a processing flow, which is carried out on the secondary side in a NAS controller interconnection system related to the second embodiment of the present invention.
Figure 19:
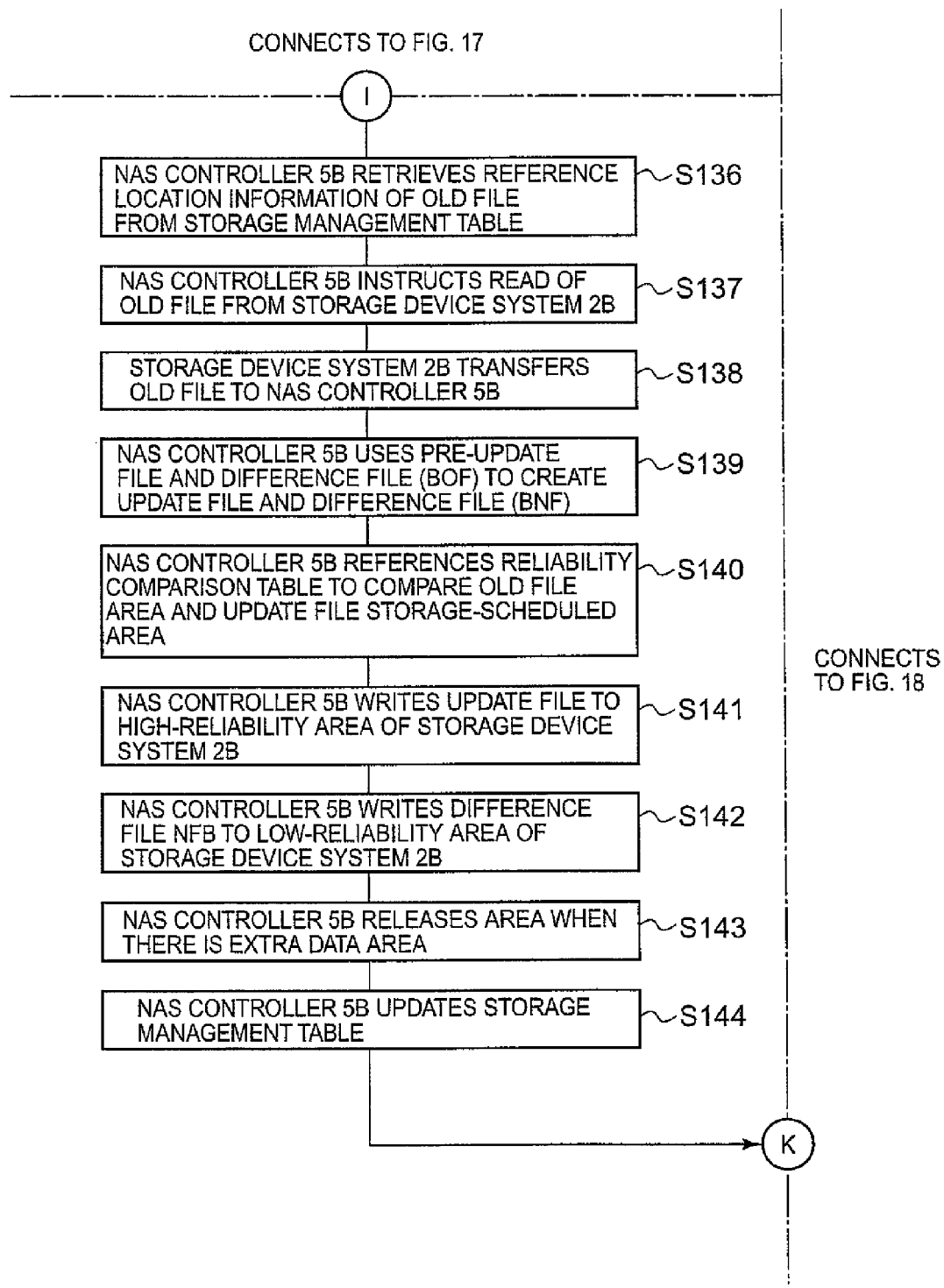
FIG. 19 shows yet another portion of an example of a processing flow, which is carried out on the secondary side in a NAS controller interconnection system related to the second embodiment of the present invention.

FIGS. 17, 18 and 19 show an example of the processing flow carried out on the secondary side in a NAS controller interconnection system.

When the NAS controller 5B receives information comprising metadata header information from the NAS controller 5A, it checks the flag in this metadata header information (S121).

If the result of S121 is a flag for new data (S122: YES), the NAS controller 5B writes the new file included in the received information to the location denoted by the reference location information of the file-metadata of this new file (S123). Further, the NAS controller 5B adds the file-metadata of this new file to the storage management table 51 (S124). Thereafter, the processing of S135 of FIG. 18 is carried out.

If the result of S121 is a flag for overlap data (S122: N0, S125: YES), the NAS controller 5B specifies the file-metadata corresponding to the file-metadata of the old file (one of the overlap files) included in the received information from the storage management table 51, and acquires the reference location information in this specified file-metadata (S126). The NAS controller 5B uses the reliability comparison table 55 to compare the reliability ranking of the LU, in which the overlap file in the acquired reference location information-denoted location is stored, against the reliability ranking of the LU having a storage-scheduled area (the LU denoted by the file-metadata of the update file (the other overlap file)) (S127).

When the result of S127 is that the reliability ranking of the storage-scheduled area LU is low (S128 of FIG. 18: NO), the processing of S133 is carried out. When the result of S127 is that the reliability ranking of the storage-scheduled area LU is high (S128 of FIG. 18: YES), the NAS controller 5B reads the old file (the one overlap file) from the LU with the low reliability ranking (S129, S130), and writes the read old file to the storage-scheduled area (S131). Then, the NAS controller 5B releases the area in which the read overlap file resides from the LU with the low reliability ranking (S132). The NAS controller 5B adds the file-metadata related to the write file (that is, the file-metadata of the update file received from NAS controller 5A) to the storage management table 51, and updates the file-metadata of the file whose area was released (S133).

The NAS controller 5B updates the overlap file list inside the system volume in the storage device system 2B (S134). For example, when the NAS controller 5B updates the overlap file list by carrying out the processing of S126 through S133, it adds information related to files, which completely overlap one another, to the overlap file list.

Further, the NAS controller 5B sends the file-metadata added to and updated in the storage management table 51 to the storage device system 2B (S135). Thus, the storage management table in the storage device system 2B is updated, with the result that this storage management table constitutes the same contents of the update storage management table 51 in the NAS controller 5B. Furthermore, the NAS controller 5B need not carry out the processing of this S135 each time S134 is carried out, but rather, for example, when the updated file-metadata reaches a predetermined number, can carry out S135 for the file-metadata of this predetermined number of updates.

If the result of S121 is a flag for updated data (FIG. 17 S122: N0, S125: NO), the NAS controller 5B specifies the file-metadata corresponding to the file-metadata of the old file included in the received information from the storage management table 51 (S136 of FIG. 19). The NAS controller 5B reads the old file from the reference location information in this specified file-metadata (S137, S138). The NAS controller 5B creates an update file based on the read old file and a difference file (BOF) in the received information, and creates a difference file (BNF) on the basis of this update file and old file (S139). The NAS controller 5B uses the reliability comparison table 55 to compare the reliability ranking of the LU of the read old file against the reliability ranking of the LU of the storage-scheduled area of the created update file (the LU denoted by the file-metadata of the update file in the received information) (S140). When the LU of the storage-scheduled area of the update file has a high reliability ranking, the NAS controller 5B writes the created post-update file to this storage-scheduled area LU (S141). Further, the NAS controller 5B a difference file (BNF) based on the created update file and the read old file to an LU with a low reliability ranking (or an LU with the same reliability ranking) (S142). Further, the NAS controller 5B releases the area in which the read old file resides (S143). The NAS controller 5B updated the storage management table 51 in accordance with the update file write, the difference file (BNF) write, and the releasing of the old file area. Thereafter, the processing of the above-mentioned S134 and S135 of FIG. 18 is carried out.

Thus, since the secondary-side NAS controller 5B can eliminate the need to transfer the update file and difference file (BNF) by creating the update file and difference file (BNF), it is able to reduce the amount of transferred data.

Furthermore, instead of sending a difference file (BOF) and generating an update file and difference file (BNF) from this difference file (BOF) on the secondary side, the constitution can also be such that the need to generate an update file is eliminated by transferring an update file. Furthermore, the selection as to which system to employ can be suitably made based on instructions from either a user or system administrator, or can be made automatically by either the NAS controller 5 or the disk controller 23 based on a prescribed condition. As the prescribed condition, for example, when the data size of the update file is less than a prescribed size, and as such will not have a significant impact on data transfer, the system whereby the update file itself is transferred can be selected, and when this is not the case, the system whereby a difference file (BOF) is created and transferred can be selected.

Embodiment 3

A third embodiment of the present invention will be explained hereinbelow.

FIG. 20A shows an overview of an information processing system related to a third embodiment of the present invention.

A backup server 101 is connected to a LAN 3. A tape library 103 is connected to the backup server 101. A tape system 105 utilizing a tape as a storage is connected to the tape library 103 as a storage device. The tape library 103 is directly connected to the backup server 101 in this example, but it can also be connected to the backup server 101 via a LAN 3 or other communications network. The tape library 103 can read and write data to a built-in tape system 105. The tape system 105 ordinarily has a plurality of tape decks for high-speed processing, but these tape decks are not shown in the figure here. Further, to keep the model simple, the figure shows one LU stored on one stowable tape of the tape library 103. More specifically, for example, as shown in the figure, LU0 data is stored on a tape 1, and LU1 data is stored on a tape 2.

A backup server registration table 102, for example, is stored in memory 7 in the NAS controller 5. Specified backup server-related information (for example, an identifier) is registered in advance in the backup server registration table 102 by a specified person (for example, the systems administrator).

The same file A resides in LU0 and LU1 of the storage device system 2 (hereinafter, primary LU0, LU1). Both file A are made recognizable to the information processing device 1 by the NAS controller 5, and the file A residing in primary LU0 is made recognizable to the backup server 101 registered in the table 102, but the file A residing in primary LU1 is hidden. Thus, hiding at least one overlap file from the registered backup server 101, for example, prevents a file of the same content from being backed up multiple times, thereby making it possible to reduce the amount of data to be backed up. As a result of this, it is also possible to shorten the time required for backup.

A file (hereinafter, metadata aggregate file) X, in which is recorded the file-metadata of various overlap files residing in the storage device system 2, is also recorded in primary LU1. Further, the NAS controller 5 makes the metadata aggregate file X in the storage device system 2 recognizable to the backup server 101 so that even the above-mentioned hidden file can be completely restored to its original state at data restoration. In FIG. 20A, the backup server 101 recognizes the metadata aggregate file X as being in LU1, which is a storage area with lower reliability. As a result of this, for example, the metadata aggregate file X is read out of the primary LU1 by the backup server 101, and stored in the secondary LU1 (LU1 in tape 2).

In this third embodiment, at least one of three modes, a first, second and third mode, is used.

(A) First Mode

In the case of a NAS, which carries out backup using a file image, backup is achieved by sequentially executing read processing from the information processing device 1. For this reason, unless some sort of mechanism is put in place, there is no hope of reducing the amount of data because two files that overlap one another are read, and both read files are transferred to the backup server 101.

Accordingly, in this first mode, when the NAS controller 5 determines an access from the registered backup server 101, it only hides the overlap file i-node of the file i-node tree from the backup server 101, making the file invisible. This makes it possible to reduce the amount of data targeted for backup. (In other words, it becomes possible to shorten the time required for backup.) More specifically, for example, all the data in the primary LU0 is recognized by the backup server 101, and as a result, all the data from the primary LU0 can be read, and backed up on the LU0 of tape 1 (hereinafter, secondary LU0).

In this first mode, the restoration of all files other than overlap files can be carried out on the tape system 105. With regard to unrestored overlap files, for example, restoration can be carried out based on the old file (the file which constitutes the original) in the secondary LU0, and the metadata aggregate file X, which was copied to the secondary LU1 (tape 2 LU1) from the primary LU1. Further, once this restoration is complete, the metadata aggregate file X can be deleted from the tape system 105.

Furthermore, when an access is received from a backup server that has not been registered in advance in the NAS controller 5, the NAS controller 5 can show this unregistered backup server all the files including the overlap files. In this case, all the files can be read to this previously unregistered backup server.

Furthermore, the NAS controller 5 can read in an update file and difference file (BNF) from the storage device system 2, restore an old file on the cache area based on the read-in update file and difference file (BNF), and transfer the restored old file to the backup server 101.

Also, as explained hereinabove, the NAS controller 5 can collect together the file-metadata of the files in an invisible state in LU1 and write it to a certain LU (for example, LU1 shown in the figure) as a single metadata aggregate file X so as to enable these invisible files to be restored to their previous states at restoration time. In this case, restoration is made possible while striving to reduce the amount of data by virtue of the backup server 101 reading out the hidden file based on the information written to this metadata aggregate file X, and writing it to an LU in the tape system 105 via the tape library 103.

Also, for example, file attributes that make it possible to distinguish between other ordinary files can also be set in the metadata aggregate file X, or, steps can be taken so as to enable files to be identified using paths (folders)/filenames managed by either the NAS controller 5 or disk controller 23. In this case, the NAS controller 5 can reconstruct the storage management table (For example, processing for updating reference location information in file-metadata using information denoting the location where real file data actually exists.) using real files, which reside in an LU with a higher reliability ranking than the LU in which files specified from the pertinent metadata aggregate file X are stored (That is, files that actually exist as data rather than files that exist virtually as a result of clearing a storage area.).

(B) Second Mode

The second mode backs up the difference file (BOF) or difference file (BNF) itself. In this case, it is possible to hold down the storage capacity required by a tape of the tape system 105. That is, in the first mode, an old file is restored on the basis of an update file and a difference file (BNF), and this restored old file is provided to the backup server 101, but in the second mode, the difference file (BNF) is provided as-is to the backup server 101. Thus, it is possible to reduce the amount of data being backed up more than in the first mode. However, in this second mode, since it can be necessary for the backup server 101 to create an old file based on a difference file (BNF), this function must be provided to a backup server that does not have such a function.

(C) Third Mode

A physical address image of the storage device system 2 (for example, a volume image or a LU image) is treated as a file, and this file is transferred to the backup server 101. More specifically, for example, as shown in the example in FIG. 20B, the NAS controller 5 makes a file of physical address images in 1 GB continuous block units from the head of the LBA, and transfers this file (hereinafter, the physical address image file) to the backup server 101. The backup server 101 writes this physical address image file to a tape of the tape system 105 by way of the tape library 103.

According to this third mode, restoration, which completely matches the contents of the storage device system 2, can be carried out on the tape system 105. In other words, the third mode is effective in cases wherein there is a large amount of data used in a certain storage area (for example, either a LU or a logical volume) of the storage device system 2, and can hold down on the storage capacity required on a tape by reducing the filename and path name information stored on the tape. Here, "the amount of data used" is the amount of data (files) occupying a certain storage area.

Further, reducing the number of times that commands and states are communicated each time a file is read not only enhances data transfer efficiency, but also makes it easy for the storage device system 2 to prefetch subsequent data, enabling the reduction of hard disk seek time and other such waiting time.

For the systems administrator, the fact that data size does not change regardless of the number of files makes it easy to calculate the allocation of storage capacity (for example, tapes) at full backup time.

Furthermore, for example, if the NAS controller 5 stores the length of transfer time that is predicted for full backup (hereinafter, predicted transfer time length) and the length of the previous access time of a registered backup server 101 (data transfer time length) in memory 7, it will also be possible to transfer at the subsequent access time a difference image from the previous time based on the difference between the predicted transfer time length and the previous access time length (the data length of the respective region image files will become smaller).

Now then, for example, selecting which of the above-mentioned first mode through third made is to be used can be made either manually or automatically. More specifically, for example, the NAS controller 5 accepts which mode of the first mode through the third mode will be used by the either information processing device 1 or the not-shown administrator's terminal, and when it receives a mode selection, can carry out backup in accordance with this selected mode.

An example of the flow of processing carried out by this third embodiment will be explained hereinbelow.

Figure 21A:
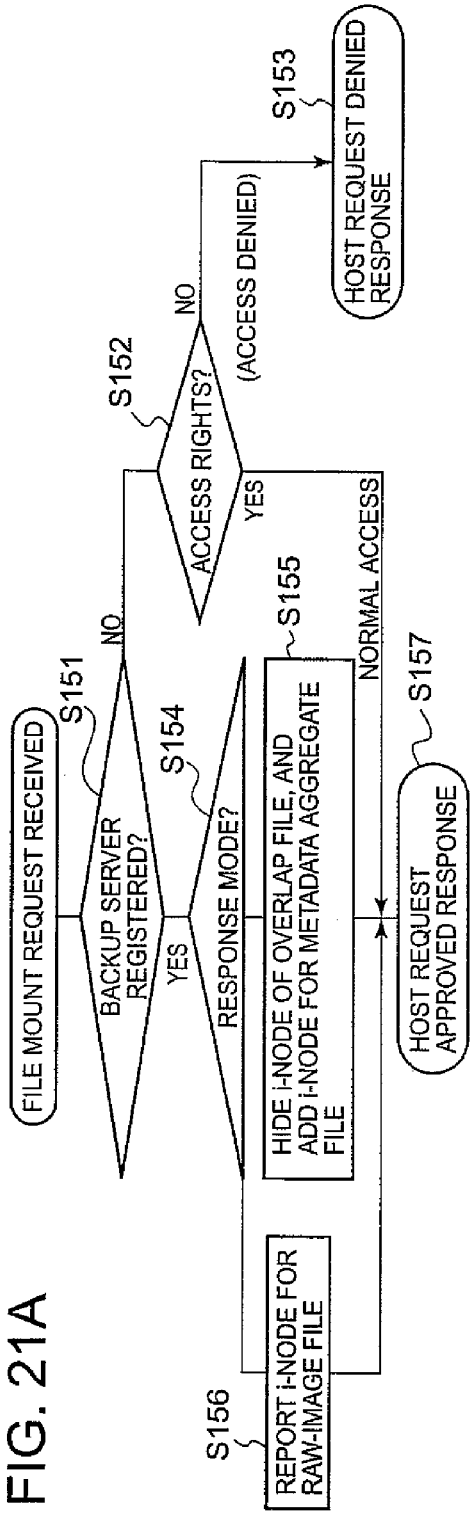
FIG. 21A shows an example of a processing flow carried out when a NAS controller 5 receives a file mount request from a backup server 101.

FIG. 21A shows an example of the flow of processing carried out when the NAS controller 5 receives a file-mount request from the backup server 101.

The NAS controller 5 makes a determination as to whether or not the identifier of the backup server 101, which is the transmission source of an access command (for example, a read command), has been registered in advance in the backup server registration table 102 (S151).

When the results of S151 are that the transmission-source backup server 101 is not registered (S151: NO), and does not have access rights (S152: NO), the NAS controller 5 returns a reply signifying that access is denied (S153).

When the results of S151 are that the transmission-source backup server 101 is not registered (S151: YES), but does have access rights (S152: YES), the NAS controller 5 returns a reply signifying that access is approved (S157).

When the result of S151 is that the transmission-source backup server 101 is registered (S151: YES), the NAS controller 5 determines which of the first through the third mode has been selected. (For example, which mode's execution is set in the memory 7 of the NAS controller 5.) (S154)

When the result of S154 is that either the first or second mode has been selected, the NAS controller 5 hides the i-node of the overlap files, adds the i-node for a metadata aggregate file X (S155), and returns an access-approved reply (S157).

When the result of S154 is that the third mode has been selected, the NAS controller 5 adds the i-node of a generated raw-file image (i-node for a physical address image) (S156), and returns an access-approved reply (S157).

Thus, a determination as to whether or not to hide overlap files is made when a file-mount request is received.

Therefore, when the NAS controller 5 receives a read command afterwards, overlap files can be hidden from the backup server 101 even when it is not possible to determine if this read command is a read command for backup, or an ordinary read command from the information processing device 1.

Figure 21B:
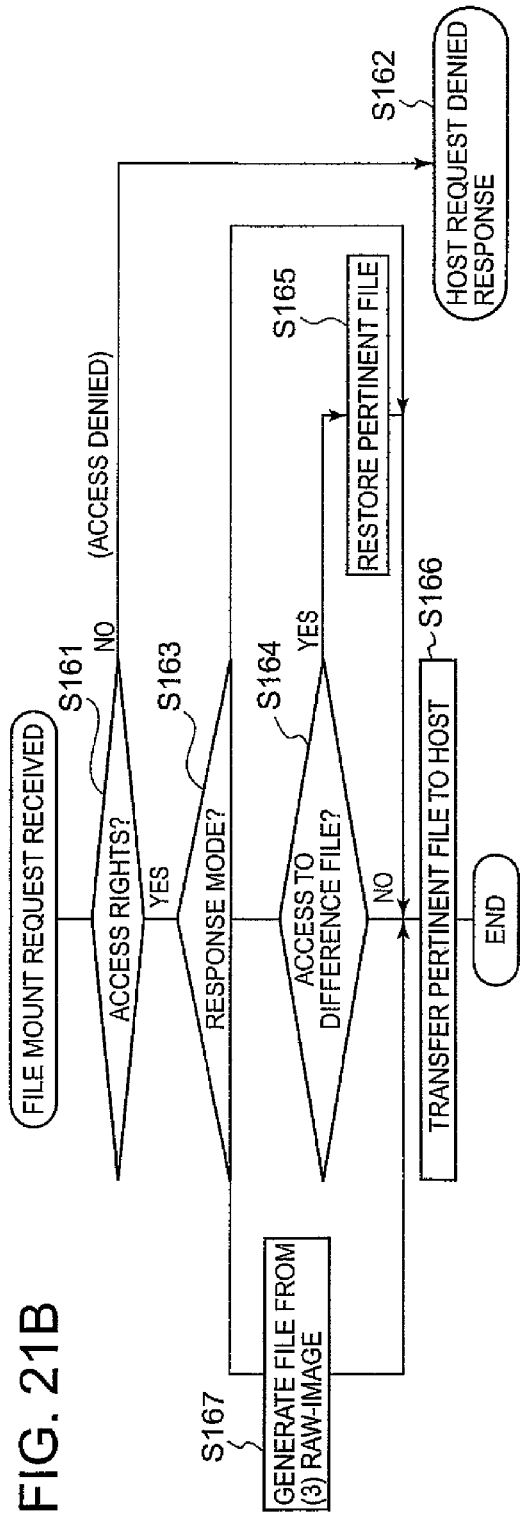
FIG. 21B shows an example of a processing flow carried out when a NAS controller 5 receives a file read command from a backup server 101.

FIG. 21B shows an example of the processing flow carried out when the NAS controller 5 receives a file read command from the backup server 101.

When the received file read command is from a backup server that does not have access rights (S161: NO), the NAS controller 5 returns a reply signifying that access is denied (S162).

When the received file read command is from a backup server that does have access rights (S161: YES), the NAS controller 5 determines which of the first through the third mode has been selected (S163).

When the result of S163 is that the first mode has been selected, and the NAS controller 5 carries out a read in accordance with the file read command, if access to a difference file (BNF) is required (S164: YES), the NAS controller 5 restores the old file targeted for read based on this difference file (BNF), and sends the restored old file to the backup server 101 (S166). Conversely, if access to a difference file (BNF) is not required (S164: NO), the NAS controller 5 reads out the read-targeted file, and sends the read file to the backup server 101 (S166).

When the result of S163 is that the second mode has been selected, the NAS controller 5 sends the difference file (BNF), which was read out in accordance with the file read command, to the backup server 101 (S166).

When the result of S163 is that the third mode has been selected, the NAS controller 5 creates a physical address image file representing a physical address image (S167), and sends this physical address image file to the backup server 101 (S166).

As described hereinabove, the NAS controller 5 can carry out backup using a method that corresponds to the mode, which has been selected.

Embodiment 4

A fourth embodiment of the present invention will be explained hereinbelow.

Figure 22:
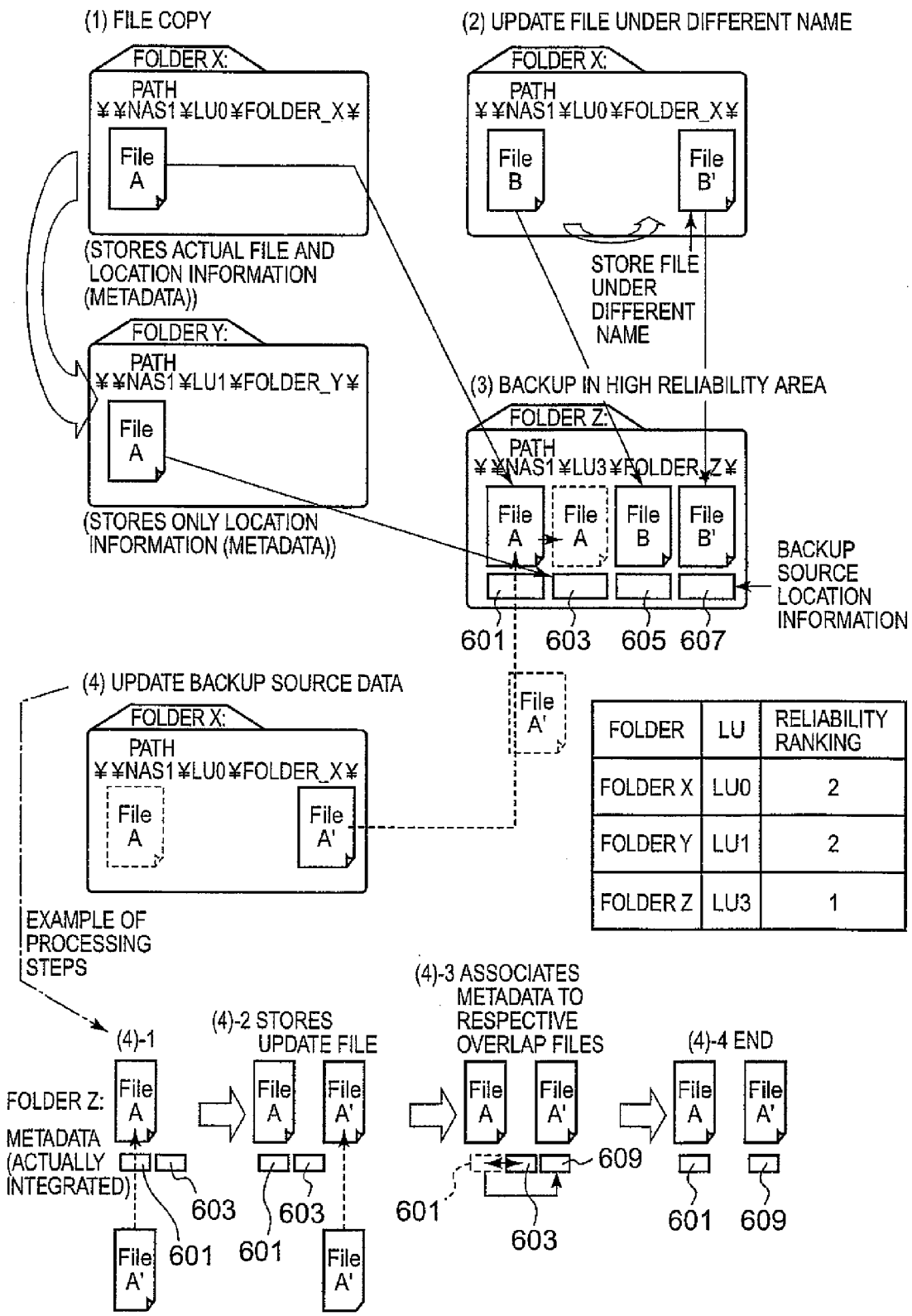
FIG. 22 shows an overview of processing carried out by a fourth embodiment of the present invention.

FIG. 22 shows an overview of processing carried out by a fourth embodiment of the present invention.

This fourth embodiment is an example of when the first embodiment of the present invention is applied to ILM (Information Lifecycle Management).

That is, in the first embodiment, the detection of files that are either completely or partially overlapped can be carried out in a shorter period of time than when the above-mentioned brute-force method is used. When carrying out operations for managing file copies or versions, there is a high likelihood that these files are important. In this fourth embodiment, important data is identified, and data identified as being important is backed up without hesitation to an area with a higher reliability ranking.

For example, the NAS controller 5 can determine if a completely or partially overlap file is an important file, and can either migrate or back up this file to an area, which has a high reliability ranking. More specifically, for example, when files that overlap one another either completely or partially are detected, the NAS controller 5 will back up to a secured high reliability area one of the files in the case of files that are completely overlapped, and both of the files in the case of files that are partially overlapped. Thus, even when data is lost from areas that are not highly reliable due to malfunctions and the like, since important data is protected in a high reliability area, the risk of losing important data can be reduced. Furthermore, here, a "high reliability area" can be a storage area with a higher reliability ranking than the storage area where the pre-migration file was stored, or it can be a storage area secured in advance as the storage area with the highest reliability ranking.

Further, for example, when the source file or a file that has been backed up once is updated, the NAS controller 5 reflects this in the backup destination as well. Thus, even when data is lost from areas that are not highly reliable due to malfunctions and the like, for example, the most recent file can be recovered by a systems administrator or a user with access rights accessing the relevant high reliability area.

Further, for example, the NAS controller 5 can save an update log of important data to this high reliability area by managing this area as a WORM area (Write Once, Read Many area).

An overview of an example of a processing flow carried out by this fourth embodiment will be explained below by referring to FIG. 22.

For example, as shown in FIG. 22, it is supposed that folder X is in LU0, folder Y is in LU1, and folder Z is in LU3 inside the storage device system 2. It is supposed that file A and file B are in folder X. It is also supposed that a reliability ranking of "2" is allocated to LU0 and LU1, and a higher reliability ranking of "1" is allocated to LU3.

In this case, for example, when the NAS controller 5 copies file A of folder X to folder Y, it uses reliability comparison table 55 to search for a LU that has a higher reliability ranking than LU0, in which folder X resides, and copies file A of folder X to folder Z in LU3, which was located as a result of the search. Then, the NAS controller 5 stores file A itself of folder X, and the file-metadata 601 comprising the reference location information denoting the location of this file A, in folder Z. The NAS controller 5 also associates the file-metadata 603 comprising the reference location information denoting the location of file A in folder Y, to the file A of folder Z (for example, it integrates this metadata into file A).

Further, for example, when the NAS controller 5 updates file B in folder X under a different filename, it copies both the old file B and the update file B' to folder Z. The NAS controller 5 also associates the file-metadata 605 comprising the reference location information denoting the location of file B in folder X, to the file B stored in folder Z (for example, it integrates this metadata into file B), and associates the file-metadata 607 comprising the reference location information denoting the location of file B', to the file B' stored in folder Z (for example, it integrates this metadata into file B).

Further, for example, when the NAS controller 5 updates file A of folder X, which is the backup source, to file A', it also reflects this update in folder Z, the backup destination. More specifically, for example, as shown in the bottom portion of FIG. 22, the NAS controller 5 deletes one of the file-metadata 601, 603 of file A, and associates the file-metadata 609 comprising the reference location information of update file A' in backup source folder X, to the update file A' stored in folder Z (for example, it integrates this metadata into update file A').

FIG. 23 is an example showing a more detailed overview of the processing flow shown in FIG. 22.

For example, when S69 of FIG. 11 is NO, if the old file has not been backed up (S201: NO), the NAS controller carries out the processing of S202 and subsequent steps. The NAS Controller 5 can determine whether or not data has been backed up, for example, whether or not the same file-metadata as the file-metadata of the data related to an old file (the above-mentioned second data or third data) has been associated to a file in a high reliability area, by referencing and checking the storage management table 51.

The NAS controller 5 writes the first data to a high reliability area (S202), and adds an entry (either all or part of the file-metadata) of the first data written to the high reliability area to the storage management table 51 (S203). The NAS controller 5 also writes the data of the old file of this first data (the above-mentioned second data or third data) to a high reliability area (S204), and adds an entry of the data of the old file written to the high reliability area to the storage management table 51 (S205). In addition, the NAS controller 5 writes the entries added in S203 and S205 to a high reliability area (S212).

When S69 of FIG. 11 is NO, if the data has been backed up (S201: YES), the NAS controller 5 writes the first data to a high reliability area (S206), and updates the entry (the entry corresponding to the first data) in the storage management table 51 (S207). Thereafter, the above-mentioned S212 is carried out.

When S69 of FIG. 11 is YES, and the first data (the write-targeted file) and an overlap file have not been backed up (S201: NO), the NAS controller 5 writes the first data to a high reliability area (S209), and adds an entry for this first data and an overlap either second data or third data (the original file, in other words, a completely overlapped old file) to the storage management table 51 (S210). Then, the NAS controller 5 adds an entry for the first data to the storage management table 51 (S211), and carries out S212.

When S69 of FIG. 11 is YES, and the first data (the write-targeted file) and an overlap file have been backed up (S201: YES), the NAS controller 5 carries out the above-mentioned S211 and S212 without carrying out S209 and S211.

In this fourth embodiment, an old file and a file, which is either completely or partially overlapped, can be backed up without hesitation in a LU with a high reliability ranking.

A number of preferred embodiments have been explained hereinabove, but these embodiments are examples for explaining the present invention, and the purport is not to restrict the scope of the present invention to these embodiments alone. The present invention can be implemented in a variety of other aspects as well.

For example, as shown in FIG. 24, the functions of the NAS controller 5 can be incorporated into the disk controller 23, and the NAS controller 5 need not be provided. More specifically, for example, the processing capable of being carried out by the CPU 11 of the NAS controller 5 can be carried out by the CPU 25 of the disk controller 23.

For example, more than one physical storage device 45 and/or 46 can be mounted in the base chassis 21 as well. Further, a plurality of types of physical storage devices 45, 46 can coexist in the respective expansion chassis 23.

Also, for example, a flag signifying that a file is an overlap file, and the reference location of the file-metadata of the file that overlaps it can also be recorded in the file-metadata registered in the storage management table 51. This makes it possible to retrieve information as to which files overlap which other files by referencing the storage management table 51. Further, when one of the two files that overlap each other is deleted, the file-metadata of this one file can be deleted, and the file-metadata of the other file can be updated. Furthermore, for example, it is considered desirable to make combined use of a system, which utilizes an overlap file list 403 in order to facilitate the retrieval of three or more overlap files.

Also, for example, if there are up to two overlap files, operation will coincide with the object, but when there are three or more overlaps, there will be cases when a portion of these is unnecessary. As explained above, since the overlapped parts are shared, the pressure on a storage area (consumption) is small, but ill affects from a decline in retrieval efficiency can be expected. For this reason, it is desirable to delete unnecessary files. Accordingly, for example, the CPU 11 of the NAS controller 5 can monitor whether or not the number of files that overlap one another (hereinafter, number of overlaps) has reached a predetermined number, and when it is determined that this predetermined number has been reached, it can notify this fact to the information processing device 1 into which the respective files are written. Since the CPU 11 of the NAS controller 5 can recognize the information processing device 1 into which a file is written, it can collectively communicate path names and other such file-metadata of other overlap files by sending a message to this information processing device 1 regarding write operations that result in the number of overlaps being more than the predetermined number, and can urge the user of the information processing device 1 to delete an updated file (for example, a copied file). In addition, for example, by associating the ID of an information processing device 1 and its mailing address, and storing these in the memory 7 of the NAS controller 5, when the number of overlaps reaches a predetermined number, the CPU 11 can automatically send an e-mail disclosing to the owner(s) of the respective files (the information processing device 1 and/or user) that the number of overlaps has reached a predetermined number, and can urge that an unnecessary file be deleted.

Also, for example, reliability rankings can be allocated in units other than LU units (for example, volume units or block units).

Further, for example, the reliability of a storage area can be determined using a method other than the method for referencing a reliability ranking. For example, the reliability level can also be determined on the basis of that RAID level and/or the type of storage device (for example, FC or SAS).

Also, for example, a determination as to whether or not an overlap file exists, for example, can be carried out by a CPU executing a prescribed computer program, or it can be carried out by a hardware circuit (for example, a data controller 14).

Also, for example, when the reliability rankings of a first LU in which a first overlap file is stored, and a second LU in which a second overlap file is stored are the same, the CPU 11 can release the areas in which overlap data resides from the LU that has less free area.

What is claimed is:
1. A computer system, comprising:
a processor;
a first storage system including a first plurality of storage devices configuring primary logical units and a first controller controlling read/write accesses from a first host computer to the primary logical units; and
a second storage system including a second plurality of storage devices configuring secondary logical units corresponding to the primary logical units and a second controller storing data received from the first storage system to the secondary logical units;
wherein the first controller is configured: to compare a first data stored in a first reference location in the primary logical units to a second data stored in a second reference location in the primary logical units, and to detect if the first data is the same as the second data, and when the first data is the same as the second data, the first controller is configured: to release a storage area storing the second data from the primary logical units, and to update a second metadata of the second data to change refer- ence location information from the second reference location to the first reference location, and wherein the first controller detects overlap of a first file stored in the first reference location in the first logical unit of the primary logical units and a second file stored in the second reference location in the second logical unit of the primary logical units, in which a reliability of the first logical unit is higher than the reliability of the second logical unit, wherein the first controller updates a second metadata of the second data to change reference location information from the second reference location to the first reference location, wherein the first controller sends the first file and the metadata file to the second storage system, and wherein when the first host computer updates an original file stored in the primary logical units by using a different filename as a new file, the first controller detects overlap data between the original file and the new file, creates a difference file based on the new file, releases a storage area of the original file from the primary logical units and writes the difference file to the storage area, wherein the first controller sends the difference file to the second storage system, wherein the first controller configured to create a metadata file consolidating a first metadata of the first data and the updated second metadata of the second data, and send the created metadata file and the first data to the second storage system without sending the second data to the second storage system.

2. A computer system according to claim 1,
wherein the second storage system is connected to a second host computer, and
wherein when the second host computer requests restoration of a certain replication set of the first data and the second data, the second controller restores the replication set of the first data and the second data based on the received first data and reference location information corresponding to the replication set of the metadata file.

3. A computer system according to claim 1,
wherein the first controller sends the metadata file after transmitting the first data to the second storage system.

4. A computer system according to claim 1,
wherein the first controller reads a file from at least one of the primary logical units, marks the read file when the file is read out, controls a predetermined number of marked files,
wherein the first controller compares data stored in the primary logical units and the data of the particular marked files, sequentially from the most recently marked file, whether or not the data of the data of the file overlaps the data of the particular marked files.

5. A storage system coupled to a backup storage system comprising:
a processor;
a plurality of storage devices configuring primary logical units; and
a controller controlling read/write accesses from a host computer to the primary logical units;
wherein the first controller is configured: to compare a first data stored in a first reference location in the primary logical units to a second data stored in a second reference location in the primary logical units, and to detect if the first data is the same as the second data, and when the first data is the same as the second data, the first controller is configured: to release a storage area storing the second data from the primary logical units, and updates to update a second metadata of the second data to change reference location information from the second reference location to the first reference location, and wherein the controller detects overlap of a first file stored in the first reference location in the first logical unit of the primary logical units and a second file stored in the second reference location in the second logical unit of the primary logical units, in which a reliability of the first logical unit is higher than the reliability of the second logical unit, wherein the controller updates a second metadata of the second data to change reference location information from the second reference location to the first reference location, wherein the controller sends the first file and the metadata file to the backup storage system, wherein when the host computer updates an original file stored in the primary logical units by using a different filename as a new file, the controller detects overlap data between the original file and the new file, creates a difference file based on the new file, releases a storage area of the original file from the primary logical units and writes the difference file to the storage area, wherein the controller sends the difference file to the backup storage system, wherein the first controller is configured to create a metadata file consolidating a first metadata of the first data and the updated second metadata of the second data, and send the created metadata file and the first data to the backup storage system without sending the second data to the backup storage system.

6. A storage system according to claim 5,
wherein the backup storage system is connected to a computer, and
wherein when the computer requests restoration of a certain replication set of the first data and the second data, the backup storage system restores the replication set of the first data and the second data based on the received first data and reference location information corresponding to the replication set of the metadata file.

7. A storage system according to claim 5,
wherein the controller sends the metadata file after transmitting the first data to the backup storage system.

8. A storage system according to claim 5,
wherein the controller reads a file from at least one of the primary logical units, marks the read file when the file is read out, controls a predetermined number of marked files,
wherein the controller compares data stored in the primary logical units and the data of the particular marked files, sequentially from the most recently marked file, whether or not the data of the data of the file overlaps the data of the particular marked files.

9. A computer system, comprising:
a processor;
a first storage system including a first plurality of storage devices configuring primary logical units and a first controller controlling read/write accesses from a first host computer to the primary logical units; and
a second storage system including a second plurality of storage devices configuring secondary logical units corresponding to the primary logical units and a
second controller storing data received from the first storage system to the secondary logical units;
wherein the first controller is configured: to compare a first data stored in a first reference location in the primary logical units to another data stored in another reference location in the primary logical units, and to detect if the first data represents a redundant duplicate of the another data, and when the first data is the redundant duplicate of the another data, the first controller is configured: to release a storage area storing the another data from the primary logical units to free up such storage area for another use, and to update a second metadata of the another data to change reference location information from pointing to the another reference location to pointing to the first reference location, and wherein the first controller detects overlap of a first file stored in the first reference location in the first logical unit of the primary logical units and another file stored in the second reference location in the second logical unit of the primary logical units, in which a reliability of the first logical unit is higher than the reliability of the second logical unit, wherein the first controller updates a second metadata of the another data to change reference location information from pointing to the another reference location to pointing to the first reference location, wherein the first controller sends the first file and the metadata file to the second storage system, wherein when the first host computer updates an original file stored in the primary logical units by using a different filename as a new file, the first controller detects overlap data between the original file and the new file, creates a difference file based on the new file, releases a storage area of the original file from the primary logical units and writes the difference file to the storage area, wherein the first controller sends the difference file to the second storage system, wherein the first controller is configured: to create a metadata file consolidating a first metadata of the first data and the updated second metadata of the another data, and to send the created metadata file and the first data to the second storage system without sending the another data which is the redundant duplicate of the first data, to the second storage system.

10. A computer system according to claim 9, wherein the second storage system is connected to a second host computer, and wherein when the second host computer requests restoration of a certain replication set of the first data and the another data, the second controller restores the replication set of the first data and the another data based on the received first data and reference location information corresponding to the replication set of the metadata file.

11. A computer system according to claim 9, wherein the first controller sends the metadata file after transmitting the first data to the second storage system.

12. A computer system according to claim 9, wherein the first controller reads a file from at least one of the primary logical units, marks the read file when the file is read out, controls a predetermined number of marked files, wherein the first controller compares data stored in the primary logical units and the data of the particular marked files, sequentially from the most recently marked file, whether or not the data of the data of the file overlaps the data of the particular marked files.

* * * * *